(12) United States Patent
Lee et al.

(10) Patent No.: US 11,190,053 B2
(45) Date of Patent: Nov. 30, 2021

(54) WIRELESS POWER TRANSMITTER AND METHOD OF CONTROLLING WIRELESS POWER TRANSMITTER

(71) Applicant: SAMSUNG ELECTRONICS CO., LTD., Suwon-si (KR)

(72) Inventors: Jinbong Lee, Suwon-si (KR); Beomwoo Gu, Suwon-si (KR); Jaehyun Park, Suwon-si (KR); Sanghyuk Wi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/889,214

(22) Filed: Jun. 1, 2020

(65) Prior Publication Data
US 2021/0143677 A1    May 13, 2021

(30) Foreign Application Priority Data
Nov. 13, 2019  (KR) .......................... 10-2019-0145082

(51) Int. Cl.
*H02J 50/12* (2016.01)
*H02M 7/48* (2007.01)
*H02P 27/08* (2006.01)
*H02J 50/80* (2016.01)

(52) U.S. Cl.
CPC .............. *H02J 50/12* (2016.02); *H02J 50/80* (2016.02); *H02M 7/48* (2013.01); *H02P 27/08* (2013.01)

(58) Field of Classification Search
CPC ...................................................... H02J 50/12

USPC ......................................................... 307/104
See application file for complete search history.

(56) References Cited

U.S. PATENT DOCUMENTS

| | | | |
|---|---|---|---|
| 2012/0139356 A1 | 6/2012 | Jung et al. | |
| 2013/0207601 A1 | 8/2013 | Wu et al. | |
| 2014/0256270 A1 | 9/2014 | Cho et al. | |
| 2014/0265615 A1* | 9/2014 | Kim ........................ | H02J 50/12 307/104 |

(Continued)

FOREIGN PATENT DOCUMENTS

| | | |
|---|---|---|
| JP | 2013-009509 A | 1/2013 |
| KR | 10-2016-0057524 A | 5/2016 |

OTHER PUBLICATIONS

Written Opinion (PCT/ISA/237) dated Sep. 1, 2020 by the International Searching Authority in International Application No. PCT/KR2020/006804.

(Continued)

*Primary Examiner* — Joseph Chang
(74) *Attorney, Agent, or Firm* — Sughrue Mion, PLLC

(57) ABSTRACT

A wireless power transmitter may include: a power factor correction (PFC) circuit configured to convert first alternating current (AC) power input from a power source into direct current (DC) power; an inverter configured to convert the DC power output from the PFC circuit into second AC power; a power transmission circuit configured to transmit wireless power, based on the second AC power output from the inverter; and at least one processor configured to identify at least one of a voltage or a current of the DC power output from the PFC circuit, and control an operation of the inverter based on the identified at least one of the voltage or the current.

23 Claims, 12 Drawing Sheets

(56) References Cited

U.S. PATENT DOCUMENTS

| | | | |
|---|---|---|---|
| 2014/0340027 A1* | 11/2014 | Keeling | H02J 3/18 320/108 |
| 2015/0311724 A1 | 10/2015 | Callanan | |
| 2016/0137080 A1 | 5/2016 | Jang et al. | |
| 2019/0089171 A1 | 3/2019 | Fischer et al. | |

OTHER PUBLICATIONS

International Search Report (PCT/ISA/210) dated Sep. 1, 2020 issued by the International Searching Authority in International Application No. PCT/KR2020/006804.

* cited by examiner

WIRELESS POWER TRANSMITTER AND METHOD OF CONTROLLING WIRELESS POWER TRANSMITTER

CROSS-REFERENCE TO RELATED APPLICATION(S)

This application is based on and claims priority under 35 U.S.C. § 119 to Korean Patent Application No. 10-2019-0145082, filed on Nov. 13, 2019, in the Korean Intellectual Property Office, the disclosure of which is incorporated by reference herein in its entirety.

BACKGROUND

1. Field

The disclosure relates to a wireless power transmitter and a method of controlling the wireless power transmitter and, more particularly, to a wireless power transmitter for wirelessly providing power to a wireless power receiver having no constant voltage control circuit or constant current control circuit and a method of controlling the wireless power transmitter.

2. Description of Related Art

Portable digital communication devices have become essential to many people in modern times. Customers desire to receive various high-quality services anywhere around the clock. In addition, it has become possible to connect various sensors, home appliances, communication devices or the like existing in our lives over a network through the Internet of Things (IoT). A wireless power transmission system supplies power to the various wireless devices.

When a wireless power transmission system of the Qi or A4WP standard is applied to a high-power system, a ripple is generated in the output voltage of a power factor correction (PFC) circuit, and thus a ripple is also generated in a voltage and a current at a battery charging terminal of a wireless power receiver. Accordingly, in order to satisfy the charging specification of the battery of the wireless power receiver, a wireless power receiver having a constant voltage control circuit or a constant current control circuit has been widely supplied. The constant voltage control circuit or the constant current control circuit may include, for example, a filter including a high-capacity capacitor and an inductor, a DC/DC converter, and a regulator.

The constant voltage control circuit or the constant current control circuit of the wireless power receiver has a large size and increases the unit cost of production of the wireless power receiver, and thus a wireless power receiver having no constant voltage control circuit or constant current control circuit has been supplied to reduce the unit cost of production and the size. When the wireless power receiver does not have the constant voltage control circuit or the constant current control circuit, the wireless power transmitter, which supplies wireless power to the wireless power receiver, is required to have the constant voltage control circuit at an output terminal of a PFC circuit. The constant voltage control circuit included in the wireless power transmitter may include, for example, a high-capacity capacitor, an inductor, an active filter, a regulator, or a DC/DC converter.

However, when a wireless power transmitter which supplies wireless power to a wireless power receiver having no constant voltage control circuit or constant current control circuit includes a constant voltage control circuit at an output end of a PFC circuit, the size of the entire circuit included in the wireless power transmitter may increase and the unit cost of production may also increase.

SUMMARY

In accordance with an aspect of the disclosure, there is provided a wireless power transmitter including: a power factor correction (PFC) circuit configured to convert first alternating current (AC) power input from a power source into direct current (DC) power; an inverter configured to convert the DC power output from the PFC circuit into second AC power; a power transmission circuit configured to transmit wireless power, based on the second AC power output from the inverter; and at least one processor configured to identify at least one of a voltage or a current of the DC power output from the PFC circuit, and control an operation of the inverter based on the identified at least one of the voltage or the current.

The at least one processor may be further configured to, based on the identified at least one of the voltage or the current, control at least one of an operation frequency of the inverter, a duty ratio of a signal input into a gate of the inverter, or a phase of the signal input into the gate of the inverter.

The at least one processor may be further configured to, based on the identified at least one of the voltage or the current, control the operation of the inverter until a difference between a value of the DC power and a reference power value becomes equal to or smaller than a predetermined value.

The wireless power transmitter may further include a communication circuit configured to communicate with a wireless power receiver, wherein the at least one processor may be further configured to identify the reference power value based on information received from the wireless power receiver through the communication circuit.

The information received from the wireless power receiver through the communication circuit may indicate an error between a voltage value of a battery of the wireless power receiver and a reference voltage value of the battery and an error between a current value of the battery and a reference current value of the battery.

A frequency of identification of the at least one of the voltage or the current by the at least one processor may be higher than a frequency of reception of the information by the at least one processor from the wireless power receiver through the communication circuit.

The at least one processor may be further configured to: identify a first reference value of reception side wireless power received by the wireless power receiver, based on the information received from the wireless power receiver through the communication circuit; identify a second reference value of the wireless power transmitted by the power transmission circuit by multiplying the first reference value of the reception side wireless power by a reciprocal number of a numerical value of a power efficiency of the wireless power transmitted by the power transmission circuit; and identify the reference power value based on the second reference value of the wireless power transmitted by the power transmission circuit.

The at least one processor may be further configured to: identify the voltage and the current of the DC power; identify the value of the DC power based on the identified voltage and the identified current; and control an operation frequency of the inverter until the difference between the value of the DC power and the reference power value becomes equal to or smaller than the predetermined value.

The wireless power transmitter may further include a memory configured to store a relationship among the voltage of the DC power, an operation frequency of the inverter, and the value of the DC power, wherein the at least one processor may be further configured to: identify the voltage of the DC power; and control the operation frequency of the inverter to make the value of the DC power equal to the reference power value, based on the identified voltage of the DC power and the relationship stored in the memory.

The communication circuit may be further configured to communicate via Bluetooth Low Energy communication.

According to an aspect of the disclosure, there is provided a method performed by at least one processor included in a wireless power transmitter, the method including: identifying at least one of a voltage or a current of direct current (DC) power output from a power factor correction (PFC) circuit of the wireless power transmitter and input into an inverter of the wireless power transmitter; and controlling an operation of the inverter based on the identified at least one of the voltage or the current.

The controlling the operation of the inverter may include controlling at least one of an operation frequency of the inverter, a duty ratio of a signal input into a gate of the inverter, or a phase of the signal input into the gate of the inverter.

The controlling the operation of the inverter may include controlling the operation of the inverter until a difference between a value of the DC power and a reference power value becomes equal to or smaller than a predetermined value, based on the identified at least one of the voltage or the current.

The method may further include: receiving information from a wireless power receiver through a communication circuit of the wireless power transmitter; and identifying the reference power value, based on the information received from the wireless power receiver.

The received information may indicate an error between a voltage value of a battery of the wireless power receiver and a reference voltage value of the battery and an error between a current value of the battery and a reference current value of the battery.

The identifying the at least one of the voltage or the current may be performed with a frequency higher than a frequency of the receiving the information from the wireless power receiver.

The identifying the reference power value may include: identifying a first reference value of reception side wireless power received by the wireless power receiver, based on the received information; identifying a second reference value of transmission side wireless power transmitted by the wireless power transmitter by multiplying the first reference value of the reception side wireless power by a reciprocal number of a numerical value of a power efficiency of the transmission side wireless power; and identifying the reference power value, based on the second reference value of the transmission side wireless power.

The identifying the at least one of the voltage or the current of the DC power may include identifying the voltage and the current of the DC power, and identifying the value of the DC power, based on the identified voltage and the identified current, and the controlling the operation of the inverter may further include controlling an operation frequency of the inverter until the difference between the value of the DC power and the reference power value becomes equal to or smaller than the predetermined value.

The identifying the at least one of the voltage or the current of the DC power may include identifying the voltage of the DC power, and the controlling the operation of the inverter further may include controlling an operation frequency of the inverter to make the value of the DC power equal to the reference power value, based on the identified voltage and a relationship among the voltage of the DC power, the operation frequency of the inverter, and the value of the DC power that is stored in a memory of the wireless power transmitter.

In accordance with an aspect of the disclosure, there is provided a wireless power transmitter including: a power factor correction (PFC) circuit configured to convert first alternating current (AC) power input from a power source into direct current (DC) power; an inverter configured to convert the DC power output from the PFC circuit into second AC power; a power transmission circuit configured to transmit a wireless power, based on the second AC power output from the inverter; and at least one processor configured to: identify a voltage and a current of the DC power output from the PFC circuit and input into the inverter; identify a value of the DC power, based on the identified voltage and the identified current; compare the identified value of the DC power with a reference power value; and control an operation frequency of the inverter until a difference between the value of the DC power and the reference power value becomes equal to or smaller than a predetermined value, based on a result of the comparing the value of the DC power with the reference power value.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
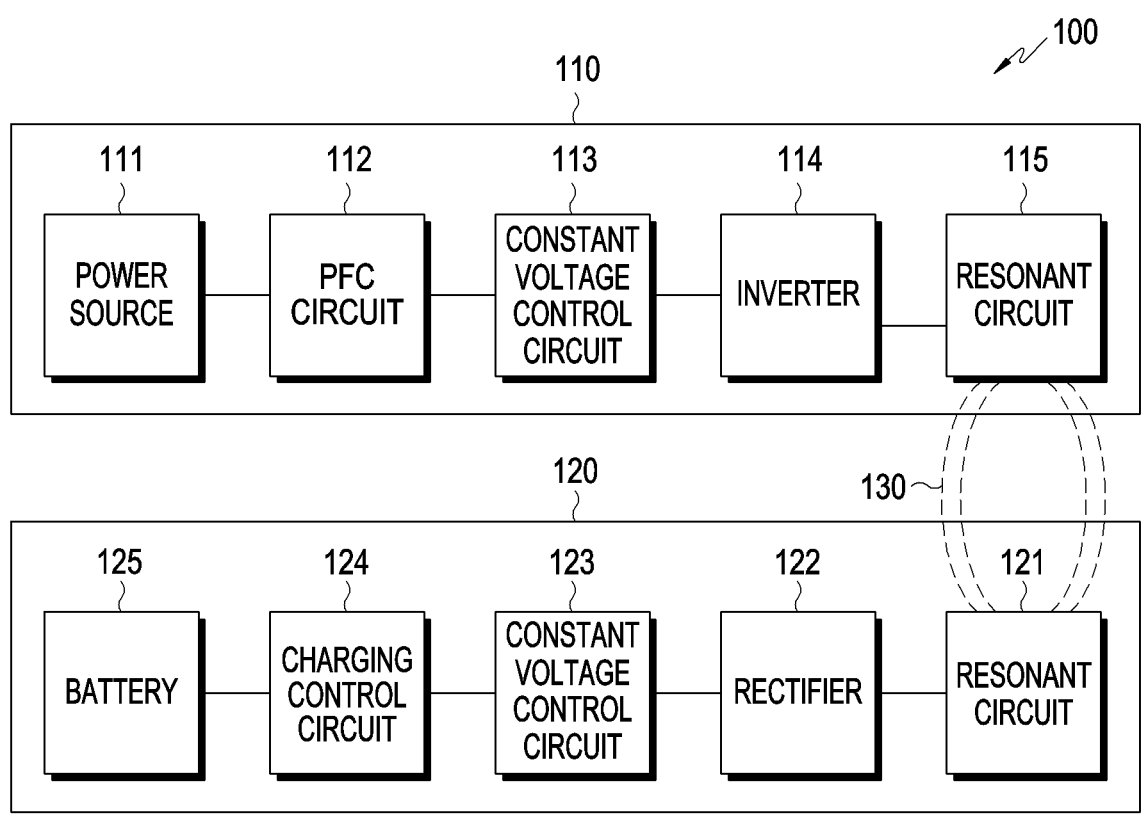
FIG. 1 is a block diagram of a wireless power transmission system according to a comparative example.

FIG. 1 is a block diagram illustrating a wireless power transmission system according to a comparative example for comparison with various embodiments. Referring to FIG. 1, a wireless power transmission system 100 may include a wireless power transmitter 110 and a wireless power receiver 120. The wireless power transmitter 110 may include a power source 111, a PFC circuit 112, a constant voltage control circuit 113, an inverter 114, and a resonant circuit 115.

The power source 111 may provide power corresponding to wireless power 130 which the wireless power transmitter 110 provides to the wireless power receiver 120. The power source 111 may be a power storage device included in the wireless power transmitter 110. For example, the power source 111 may be a battery included in the wireless power transmitter 110. Although FIG. 1 illustrates that the power source 111 is included in the wireless power transmitter 110, the power source 111 may be an external power supply of the wireless power transmitter 110 or a power interface for receiving the external power supply. For example, the power source 111 may be an AC commercial power supply (mains electricity, wall power, or grid power).

The PFC circuit 112 may include a rectifier and a power factor compensator, and may rectify AC power to DC power and compensate for a power factor. The PFC circuit 112 may receive an input AC power from the power source 111, convert the received AC power into an ouput DC power, and output the DC power. For example, when AC main power of 220 V is received, the PFC circuit 112 may output DC power having a voltage value of 400 V. A voltage output from the PFC circuit 112 may include a ripple. For example, when AC main power having a voltage of 220 V and a frequency of 60 Hz is received, a DC voltage of 400 V output from the PFC circuit 112 may include a ripple having a frequency of 120 Hz and a width of ±10 V.

The constant voltage control circuit 113 may reduce the ripple of the voltage output from the PFC circuit 112. The constant voltage control circuit 113 may include, for example, at least one of a high-capacity capacitor, an inductor, an active filter, a regulator, or a DC/DC converter. The constant voltage control circuit 113 may be implemented as, for example, a DC/DC converter and/or a regulator but there is no limitation on an implementation form thereof.

The inverter 114 may receive DC power output from the constant voltage control circuit 113, convert the received DC power into AC power, and output the AC power. The resonant circuit 115 may transmit the wireless power 130 on the basis of the AC power output from the inverter 114. The resonant circuit 115 may include at least one capacitor and a coil. Transmission of the wireless power 130 by the resonant circuit 115 may mean that an electric field and/or a magnetic field is formed by the resonant circuit 115 when AC power is applied to the resonant circuit 115.

The wireless power receiver 120 may include a resonant circuit 121, a rectifier 122, a constant voltage control circuit 123, a charging control circuit 124, and a battery 125. The resonant circuit 121 of the wireless power receiver 120 may receive the wireless power 130 transmitted by the resonant circuit 115 of the wireless power transmitter 110. The resonant circuit 121 of the wireless power receiver 120 may include at least one capacitor and a coil. The wireless power 130 received by the resonant circuit 121 may be an AC-type wireless power. Reception of the wireless power 130 may mean that an induced electromotive force is formed by the resonant circuit 121 due to a surrounding electric field and/or magnetic field of which an amplitude varies depending on the time.

The rectifier 122 may convert the AC-type wireless power 130 received by the resonant circuit 121 into DC-type wireless power and output the DC-type wireless power. For example, the rectifier 122 may output DC power having a voltage value and a current value suitable for rating of the battery 125.

The constant voltage control circuit 123 may reduce the ripple of the voltage output from the rectifier 122. The constant voltage control circuit 123 may include, for example, at least one of a high-capacity capacitor, an inductor, an active filter, a regulator, or a DC/DC converter. The constant voltage control circuit 123 may be implemented as, for example, a DC/DC converter and/or a regulator but there is no limitation on an implementation form thereof.

The charging control circuit 124 may control a process of charging the battery 125 using the voltage output from the constant voltage control circuit 123, in which the ripple is reduced.

FIG. 1 illustrates an example in which the constant voltage control circuit 113 is included in the wireless power transmitter 110, and the constant voltage control circuit 123 and the charging control circuit 124 are included in the wireless power receiver 120. However, in another comparative example, the wireless power transmitter 110 may not include the constant voltage control circuit 113 to reduce a size of the wireless power transmitter 110. Further, the wireless power receiver 120 may not include the constant voltage control circuit 123 and the charging control circuit 124 to reduce a size of the wireless power receiver 120. In this case, the voltage input into the inverter 114 of the wireless power transmitter 110 may have a ripple, and accordingly, a voltage input into the resonant circuit 115 of the wireless power transmitter 110, the wireless power 130 output from the resonant circuit 115 and received by the resonant circuit 121, and power output from the rectifier 122 may have the ripple. In this case, the power including the ripple, output from the rectifier 122 of the wireless power receiver 120 is supplied to the battery 125 of the wireless power receiver 120, and thus charging specifications of the battery 125 are not satisfied due to the ripple of the power supplied to the battery 125. In order to solve the problem of the charging specifications of the battery 125 not being satisfied, a method of transmitting information on an error between a current and/or voltage value required by the wireless power receiver 120 and an actually supplied current and/or voltage value to the wireless power transmitter 110 through Bluetooth Low Energy (BLE) communication may be used. However, in a case in which the wireless power transmitter 110 uses AC main power having a frequency of 60 Hz, the ripple has a frequency of 120 Hz but the general frequency of BLE communication ranges from 10 Hz to 100 Hz, and thus an approach of communicating the information on the error through BLE communication cannot effectively reduce the ripple.

Figure 2A:
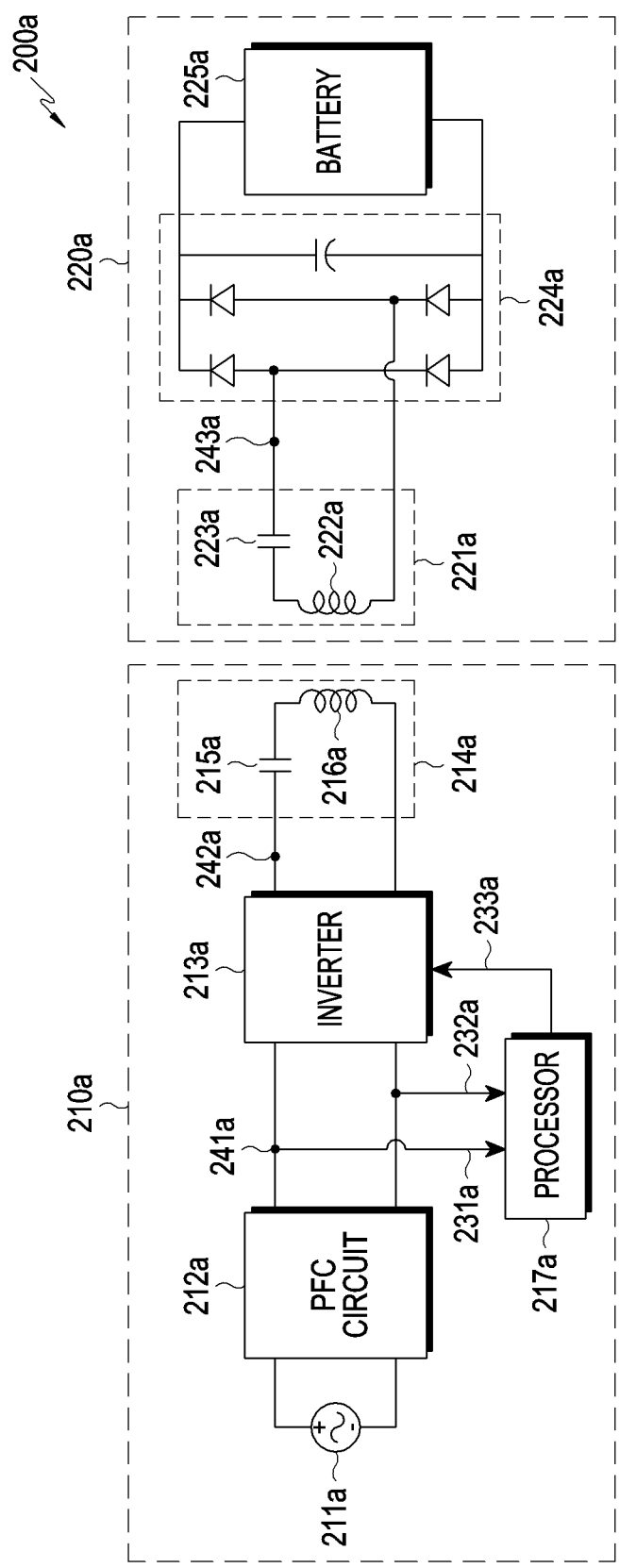
FIG. 2A is a block diagram illustrating a wireless power transmission system including a wireless power transmitter according to an embodiment.

FIG. 2A is a block diagram illustrating a wireless power transmission system including a wireless power transmitter according to an embodiment. Referring to FIG. 2A, a wireless power transmission system 200a may include a wireless power transmitter 210a and a wireless power receiver 220a. The wireless power transmitter 210a may include a power source 211a, a PFC circuit 212a, an inverter 213a, a resonant circuit 214a, and a processor 217a.

Since the detailed description made with reference to FIG. 1 may be equally applied to the power source 211a, the PFC circuit 212a, the inverter 213a, and the resonant circuit 214a, a detailed description thereof is omitted.

The processor 217a may identify at least one of a voltage 231a of power output from the PFC circuit 212a and a current 232a of power output from the PFC circuit 212a. According to an embodiment, the processor 217a may identify the voltage 231a, i.e., an output voltage, of the power output from the PFC circuit 212a by receiving a signal indicating the voltage from a voltage sensing circuit located at an output terminal of the PFC circuit 212a. According to an embodiment, the processor 217a may identify the current 232a, i.e., an output current, of the power output from the PFC circuit 212a by receiving a signal indicating the current from a current sensing circuit located at an output terminal of the PFC circuit 212a.

The processor 217a may control the operation of the inverter 213a on the basis of at least one of the identified voltage 231a or current 232a. According to an embodiment, the processor 217a may control at least one of an operation frequency of the inverter 213a, which is a switching frequency of a signal input into a gate of the inverter 213a, a duty ratio of the signal input into the gate of the inverter 213a, and a phase of the signal input into the gate of the inverter 213a on the basis of at least one of the identified voltage 231a or current 232a. The processor 217a may control the operation of the inverter 213a by transferring a control signal 233a for controlling the operation of the inverter 213a to the inverter 213a. The processor 217a may control the operation of the inverter 213a to reduce a ripple included in the power output from the inverter 213a, which will be described below.

Although FIG. 2A illustrates both the voltage 231a of the power output from the PFC circuit 212a and the current 232a of the power output from the PFC circuit 212a, the processor 217a may identify one of the voltage 231a of the power output from the PFC circuit 212a and the current 232a of the power output from the PFC circuit 212a and may not identify the other one, thereby controlling the operation of the inverter 213a on the basis of one piece of the identified information according to an embodiment. An example in which the processor 217a identifies only the voltage 231a of the power output from the PFC circuit 212a and controls the operation of the inverter 213a on the basis of the identified voltage 231a will be described with reference to FIG. 7.

According to an embodiment, the processor 217a may identify both the voltage 231a of the power output from the PFC circuit 212a and the current 232a of the power output from the PFC circuit 212a and control the operation of the inverter 213a on the basis of both the voltage 231a of the power output from the PFC circuit 212a and the current 232a of the power output from the PFC circuit 212a. An example in which the processor 217a controls the operation of the inverter 213a on the basis of both the voltage 231a of the power output from the PFC circuit 212a and the current 232a of the power output from the PFC circuit 212a will be described below with reference to FIG. 5.

Although FIG. 2A illustrates that the processor 217a identifies at least one of the voltage 231a of the power output from the PFC circuit 212a and the current 232a of the power output from the PFC circuit 212a, the processor 217a may identify at least one of the voltage or the current at an output terminal of the inverter 213a and control the operation of the inverter 213a on the basis of the identified information according to an embodiment. Hereinafter, also, in the wireless power transmission system described below with reference to FIG. 3, 5, or 7, the processor of the wireless power transmitter may identify at least one of the voltage or the current at the output terminal of the inverter and control the operation of the inverter on the basis of the identified information.

According to an embodiment, a scheme in which the processor 217a controls the operation of the inverter 213a has no limitation. For example, the processor 217a may control the operation of the inverter 213a through a Proportional-Integral (PI) control scheme, a Proportional-Integral-Differential (PID) control scheme, or a hysteresis control scheme.

The processor 217a may control at least one other element (for example, hardware or software element) of the electronic device connected to the processor 217a by executing, for example, software (for example, a program), and may perform various data processing or calculations. According to an embodiment, as at least a part of the data processing or calculations, the processor 217a may load a command or data received from another element (for example, a communication module) to volatile memory, process the command or data stored in the volatile memory, and store resultant data in non-volatile memory. According to an embodiment, the processor 217a may include a main processor (for example, a central processing unit or an application processor) and an auxiliary processor (for example, a graphic processing unit, an image signal processor, a sensor hub processor, or a communication processor) which may operate independently from the main processor or together with the main processor. Additionally or alternatively, the auxiliary processor may be configured to use lower power than the main processor or configured to be specialized in a predetermined function. The auxiliary processor may be implemented to separate from the main processor or to be a part of the main processor.

The inverter 213a may operate according to a control signal 233a from the processor 217a. According to an embodiment, the inverter 213a may operate on the basis of a frequency determined according to the control signal 233a from the processor 217a. As described below with reference to FIGS. 2C and 6A, even though there is a ripple in a voltage input into the inverter 213a, it is possible to reduce a ripple of output power of the inverter 213a by controlling an operation frequency of the inverter 123a according to the voltage ripple. Accordingly, the inverter 213a may provide power in which the ripple is reduced to the resonant circuit 214a.

The resonant circuit 214a may transmit wireless power on the basis of AC power output from the inverter 213a. The resonant circuit 214a may include at least one capacitor 215a and a coil 216a. The resonant circuit 214a may receive the power in which the ripple is reduced from the inverter 213a and thus transmit wireless power in which the ripple is reduced.

The wireless power receiver 220a may include a resonant circuit 221a, a rectifier 224a, and a battery 225a. The resonant circuit 221a of the wireless power receiver 220a may receive wireless power transmitted by the resonant circuit 214a of the wireless power transmitter 210a. Reception of the wireless power 130 may mean that an induced electromotive force is formed by the resonant circuit 214a due to a surrounding electric field and/or a magnetic field of which an amplitude varies depending on the time. As described above, the resonant circuit 214a of the wireless power transmitter 210a transmits the wireless power in which the ripple is reduced, and thus the resonant circuit 221a of the wireless power receiver 220a may receive wireless power in which the ripple is reduced. The resonant circuit 221a of the wireless power receiver 220a may include at least one capacitor 223a and a coil 222a. The wireless power received by the resonant circuit 221a may be AC power.

The rectifier 224a may convert the AC wireless power received by the resonant circuit 221a into DC power and output the DC power. For example, the rectifier 224a may output DC power having a voltage value and a current value suitable for rating of the battery 225a. The DC power output from the rectifier 224a may be used to charge the battery 225a. As described above, the resonant circuit 221a of the wireless power receiver 220 receives wireless power in which the ripple is reduced from the resonant circuit 214a of the wireless power transmitter 210a, and thus the power transmitted from the resonant circuit 221a to the rectifier 224a is power in which the ripple is reduced and the DC power supplied from the rectifier 224a to the battery 225a is also power in which the ripple is reduced.

In the wireless power transmission system 200a of FIG. 2A, the processor 217a of the wireless power transmitter 210a may identify at least one of the voltage 231a of the power output from the PFC circuit 212a or the current 232a of the power output from the PFC circuit 212a and control the operation of the inverter 213a on the basis of at least one of the identified voltage 231a or current 232a. Accordingly, in spite of the ripple in the power output from the PFC circuit 212a, the operation of the inverter 213a is controlled according to the ripple, until the wireless power transmitter 210a may provide wireless power in which the ripple is reduced to the wireless power receiver 220a. That is, power suitable for the charging specification of the battery 225a of the wireless power receiver 220a may be provided.

Figure 2B:
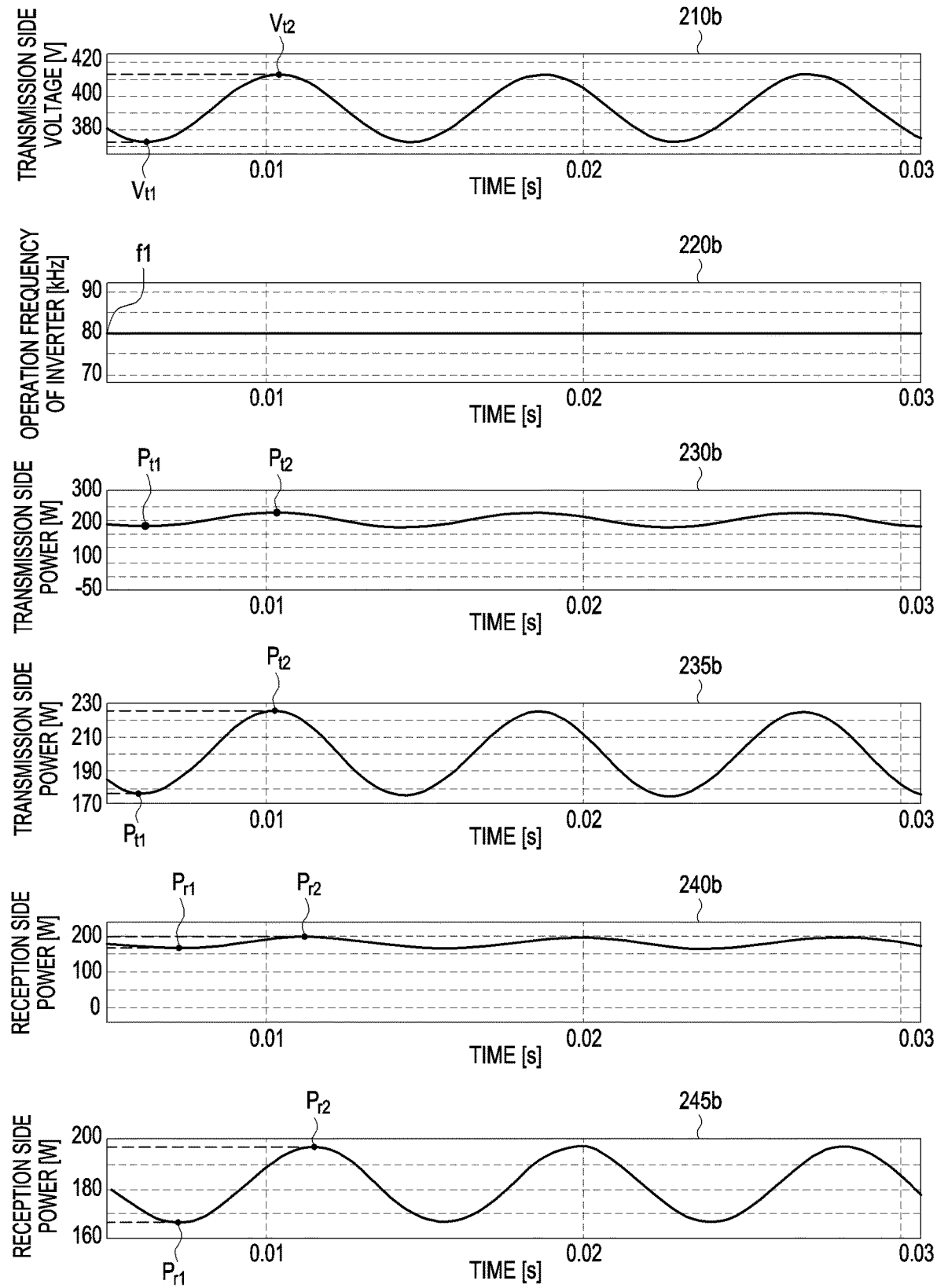
FIG. 2B illustrates parameters related to a wireless power transmission system including a wireless power transmitter and a wireless power receiver according to a comparative example.

FIG. 2B illustrates parameters related to a wireless power transmission system including a wireless power transmitter and a wireless power receiver according to a comparative example. Specifically, FIG. 2B illustrates parameters related to a comparative example in which the wireless power transmission system 100 illustrated in FIG. 1 includes the wireless power transmitter 110, which does not include the constant voltage control circuit 113, and the wireless power receiver 120, which does not include the constant voltage control circuit 123 and the charging control circuit 124. A transmission side voltage 210b indicates a ripple component of the voltage output from the PFC circuit 112 of the wireless power transmitter 110 and input into the inverter 114 in the comparative example. The voltage output from the PFC circuit 112 may ideally have the DC form, but there may be the ripple as described above. Accordingly, it is assumed that the transmission side voltage 210b as illustrated in FIG. 2B is generated in the PFC circuit 112 according to the comparative example. In the example of FIG. 2B, the transmission side voltage 210b may have a DC component of 393 V and a ripple component of ±20 V, and a minimum value $V_{t1}$ of the transmission side voltage 210b may be 373 V and a maximum value $V_{t2}$ thereof may be 413 V.

According to an embodiment, the ripple component of the transmission side voltage 210b may have a frequency of AC generated in, for example, the power source, but there is no limitation in a waveform of the actually generated ripple. An operation frequency 220b of the inverter indicates an operation frequency of the inverter 114 of the wireless power transmitter 110 in the comparative example. In the comparative example, the operation frequency 220b of the inverter may be maintained as f1. Transmission side power 230b indicates the wireless power output from the inverter 114 in the comparative example. Transmission side power 235b indicates power obtained by controlling the scale of a y axis in order to more clearly show the ripple component of the transmission side power 230b. Since the operation frequency 220b of the inverter is constantly maintained, the transmission side power 230b and 235b may include a ripple component. The transmission side power 230b and 235b may have a DC component of 200 W and a ripple component of ±20 W, and a minimum value $P_{t1}$ of the transmission side power 230b and 235b may be 175 W and a maximum value $P_{t2}$ thereof may be 225 W.

Reception side power 240b indicates the wireless power output by the resonant circuit 121b in the comparative example. Reception side power 245b indicates power obtained by controlling the scale of a y axis in order to more clearly show a ripple component of the reception side power 240. Since there is the ripple in the transmission side power 230b and 235b, the reception side power 240b and 245b may include a ripple component. The reception side power 240b and 245b may have a DC component of 180.5 W and a ripple component of ±15.5 W, and a minimum value $P_{r1}$ of the reception side power 240b and 245b may be 165 W and a maximum value $P_{r2}$ thereof may be 196 W.

Although not illustrated in FIG. 2B, for example, the transmission side power 230b and 235b and the reception side power 240b and 245b may be AC power having a frequency defined in the wireless power transmission standard. For example, the transmission side power 230b and 235b and the reception side power 240b and 245b may have a frequency higher than or equal to 100 kHz and equal to or lower than 200 kHz required for the Qi standard or a frequency of 6.78 MHz required for the AFA standard.

Figure 2C:
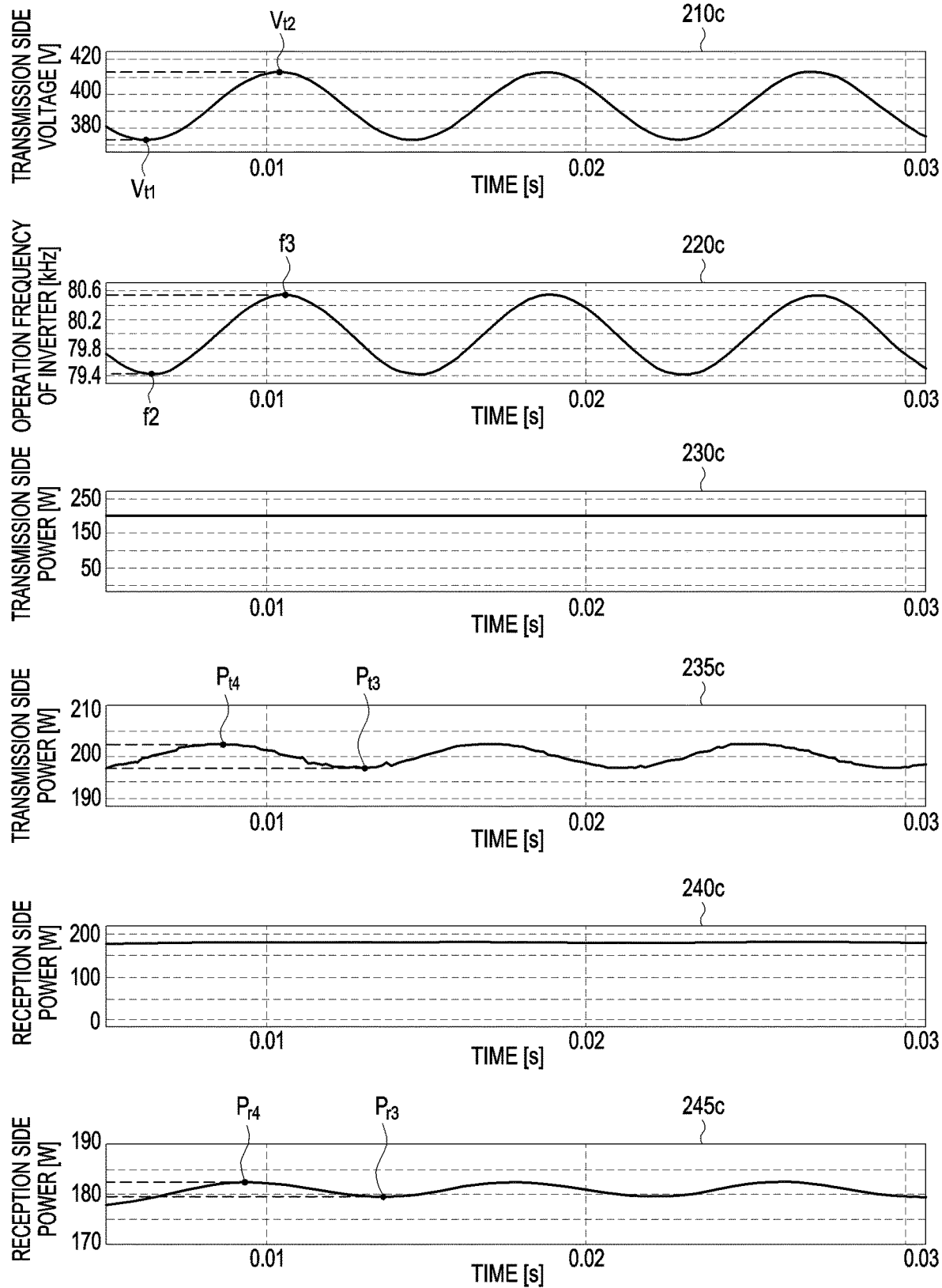
FIG. 2C illustrates parameters related to a wireless power transmission system including a wireless power transmitter according to an embodiment.

FIG. 2C illustrates parameters related to a wireless power transmission system including a wireless power transmitter according to an embodiment. Specifically, FIG. 2C illustrates parameters related to the wireless power transmission system 200a illustrated in FIG. 2A. A transmission side voltage 210c indicates a voltage output from the PFC circuit 212a of the wireless power transmitter 210a illustrated in FIG. 2A and input into the inverter 213a, that is, a voltage at a position 241a. An operation frequency 220c of the inverter indicates an operation frequency of the inverter 213a of the wireless power transmitter 210a illustrated in FIG. 2A. Transmission side power 230c indicates the amount of power output from the inverter 213a illustrated in FIG. 2A and input into the resonant circuit 214a of the wireless power transmitter 210a, that is, power at a position 242a. Transmission side power 235c indicates power obtained by controlling the scale of a y axis in order to more clearly show a ripple component of the transmission side power 230c. Reception side power 240c indicates the amount of power output from the resonant circuit 221a of the wireless power receiver 220a illustrated in FIG. 2A and input into the rectifier 224a, that is, power at a position 243a. Reception side power 245c indicates power obtained by controlling the scale of a y axis in order to more clearly show a ripple component of the reception side power 240c.

The transmission side voltage 210c may have the same DC component of 393 V and ripple component of ±20 V which are the same as those of the transmission side voltage 210b, and a minimum value $V_{t1}$ of the transmission side voltage 210c may be 373 V and a maximum value $V_{t2}$ thereof may be 413 V. However, unlike FIG. 2B, the operation frequency 220c of the inverter may be controlled according to the transmission side voltage 210c. The operation frequency 220c of the inverter may be periodically controlled with a minimum value of f2 and a maximum value of f3 based on f1 of the operation frequency 220b of the inverter. As a result, the transmission side power 230c and 235c may have a DC component of 200 W and a ripple component of ±2 W, and a minimum value $P_{t3}$ of the transmission side power 230c and 235c may be 198 W and a maximum value $P_{t4}$ thereof may be 202 W. It may be noted that the ripple component ±2 W of the transmission side power 230c and 235c according to an embodiment described with reference to FIG. 2A is smaller than the ripple component ±25 W of the transmission side power 230b and 235b according to the comparative example described with reference to FIG. 2B.

Since the ripple component of the transmission side power 230b and 235b is reduced, the ripple of the reception side power 240c and 245c may be also reduced. The reception side power 240c and 245c may have a DC component of 180.5 W and a ripple component of ±1.5 W, and a minimum value $P_{r3}$ of the reception side power 240c and 245c may be 179 W and a maximum value $P_{r4}$ thereof may be 182 W. It may be noted that the ripple component ±1.5 W of the reception side power 240c and 245c according to an embodiment described with reference to FIG. 2A is smaller than the ripple component ±15.5 W of the reception side power 240b and 245b according to the comparative example described with reference to FIG. 2B. While the ripple component of the reception side power 240b and 245b according to the comparative example described with reference to FIG. 2B has a high possibility of not satisfying the charging specification of the battery, the ripple component of the reception side power 240c and 245c according to an embodiment described with reference to FIGS. 2A and 2C may satisfy the charging specification of the battery.

Figure 3:
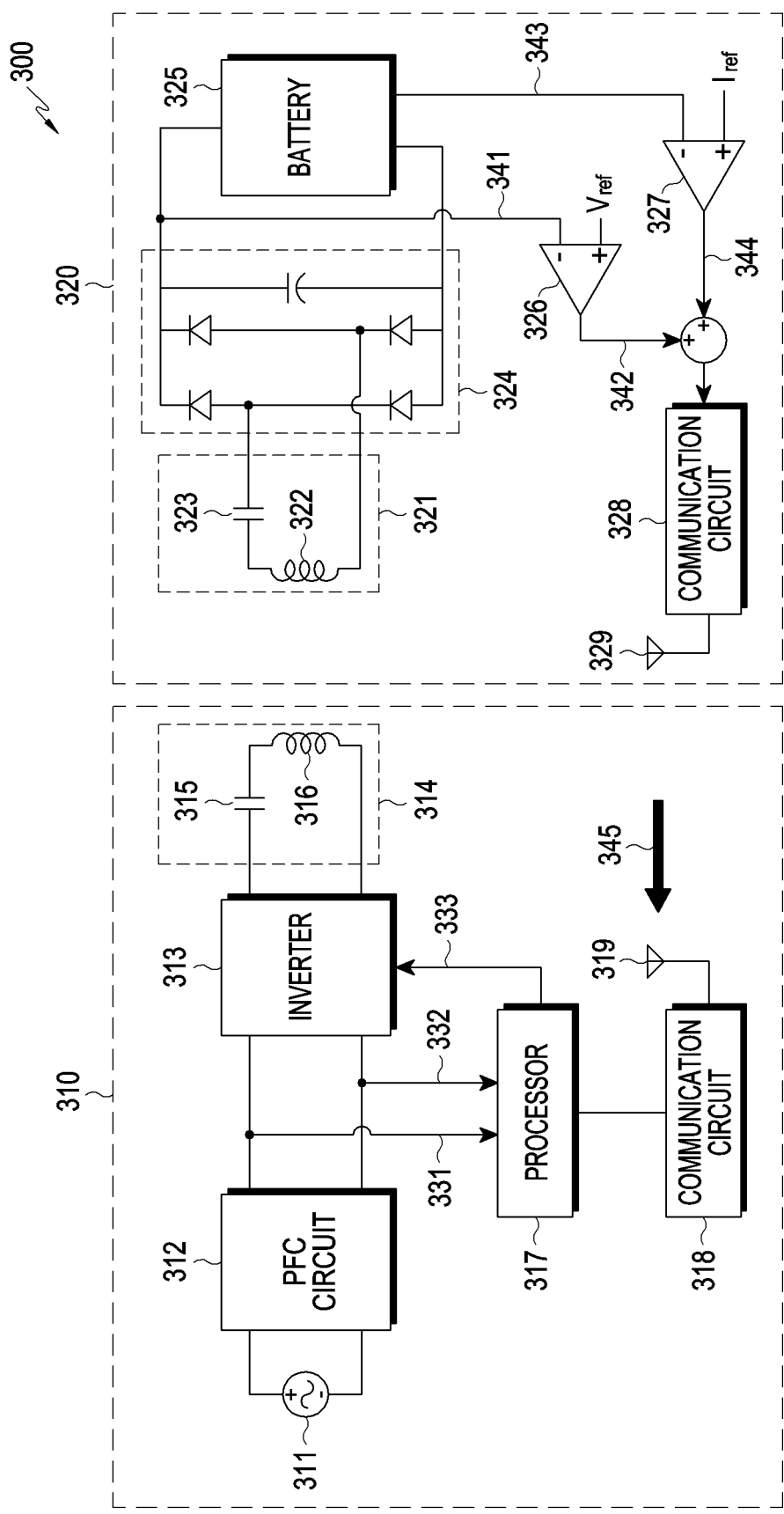
FIG. 3 is a block diagram of a wireless power transmission system including a wireless power transmitter according to an embodiment.

FIG. 3 is a block diagram of a wireless power transmission system including a wireless power transmitter according to an embodiment. Referring to FIG. 3, a wireless power transmission system 300 may include a wireless power transmitter 310 and a wireless power receiver 320. The wireless power transmitter 310 may include a power source 311, a PFC circuit 312, an inverter 313, a resonant circuit 314, a processor 317, and a communication circuit 318. The resonant circuit 314 may include a capacitor 315 and a coil 316. Since the power source 311, the PFC circuit 312, the inverter 313, the resonant circuit 314, and the processor 317 are substantially the same as the power source 211a, the PFC circuit 212a, the inverter 213a, the resonant circuit 214a, and the processor 217a described above with reference to FIG. 2A, the detailed description thereof will be omitted.

The communication circuit 318 may establish a direct (for example, wired) communication channel or a wireless communication channel between the wireless power transmitter 310 and an external electronic device (for example, the wireless power receiver 320) and support communication through the established communication channel. The communication circuit 318 may include an antenna 319. The communication circuit 318 may include one or more communication processors which are operated independently from the processor 317 (for example, an application processor) and support direct (for example, wired) communication or wireless communication. According to an embodiment, the communication circuit 318 may include a wireless communication module (for example, a cellular communication module, a short-range wireless communication module, or a Global Navigation Satellite System (GNSS) communication module) or a wired communication module (for example, a Local Area Network (LAN) communication module or a power line communication module). Among the communication modules, the corresponding communication module may communicate with an external electronic device through a first network (for example, a short-range communication network such as Bluetooth, Wi-Fi direct, or Infrared Data Association (IrDA)) or a second network (for example, a long-range communication network such as a cellular network, Internet, or a computer network (for example, a LAN or WAN)). Such various types of communication modules may be integrated into one element (for example, a single chip) or may be implemented as a plurality of separate elements (for example, a plurality of chips). The wireless communication module may identify and authenticate the wireless power transmitter 310 within a communication network such as the first network or the second network using subscriber information (for example, an international mobile subscriber identity (IMSI)) stored in a subscriber identification module.

The communication circuit 318 may support communication between the wireless power transmitter 310 and the wireless power receiver 320. According to an embodiment, the wireless power transmitter 310 may perform BLE communication with the wireless power receiver 320 through the communication circuit 318. According to an embodiment, the wireless power transmitter 310 may receive reception side error information 345 from an antenna 329 included in the wireless power receiver 320 through BLE communication using an antenna 319 of the communication circuit 318. According to an embodiment, the wireless power transmitter 310 may receive reception side error information 345 from the wireless power receiver 320 through another communication scheme other than BLE communication, supported by the communication circuit 318. The reception side error information 345 may include an error 342 between a voltage 341 of a battery 325 of the wireless power receiver 320 and a reference voltage value (Vref) of the battery and an error 344 between a current 343 of the battery 325 and a reference current value (Iref) of the battery.

The reception side error information 345 received by the wireless power receiver 320 through the communication circuit 318 may be transferred to the processor 317. The processor 317 may identify at least one of a voltage 331 of power output from the PFC circuit 312 or a current 332 of power output from the PFC circuit 312 and transmit a control signal 333 to the inverter 313 on the basis of at least one of the identified voltage 331 or current 332 and the reception side error information 345, thereby controlling the operation of the inverter 313.

Although FIG. 3 illustrates both the voltage 331 of the power output from the PFC circuit 312 and the current 332 of the power output from the PFC circuit 312, the processor 317 may identify one of the voltage 331 of the power output from the PFC circuit 312 and the current 332 of the power output from the PFC circuit 312 but not identify the other one, and control the operation of the inverter 313 on the basis of one piece of the identified information according to an embodiment. An example in which the processor 317 identifies only the voltage 331 of the power output from the PFC circuit 312 and controls the operation of the inverter 313 on the basis of the identified voltage 331 will be described below with reference to FIG. 7.

According to an embodiment, the processor 317 may identify both the voltage 331 of the power output from the PFC circuit 312 and the current 332 of the power output from the PFC circuit 312 and control the operation of the inverter 313 on the basis of both the voltage 331 of the power output from the PFC circuit 312 and the current 332 of the power output from the PFC circuit 312. An example in which the processor 317 controls the operation of the inverter 313 on the basis of both the voltage 331 of the power output from the PFC circuit 312 and the current 332 of the power output from the PFC circuit 312 will be described with reference to FIG. 5.

According to an embodiment, a frequency of the reception side error information 345 by the processor 317 from the wireless power receiver 320 through the communication circuit 318 may be lower than a frequency of identification of at least one of the voltage 331 or the current 332 of the power output from the PFC circuit 312 by the processor 317. For example, the processor 317 may identify the reception side error information 345 from the wireless power receiver 320 with the frequency higher than or equal to 10 Hz and equal to or lower than 100 Hz through BLE communication using the communication circuit 318 and identify at least one of the voltage 331 or the current 332 of the power output from the PFC circuit 312 with the frequency higher than or equal to 1 kHz and equal to or lower than 10 kHz.

According to an embodiment, the processor 317 may identify a reference power value on the basis of the reception side error information 345. The reference power value may be a preferable value of the power output from the PFC circuit 312. The processor 317 may identify a reference value of reception side wireless power indicating power received by the resonant circuit 321 of the wireless power receiver 320 on the basis of the reception side error information 345. The reception side wireless power and the transmission side wireless power indicating power output from the resonant circuit 314 of the wireless power transmitter 310 have the following relationship therebetween.

$$P_{tx_{ref}}(t) = P_{rx_{ref}}(t) \times \frac{P_{tx}(t)}{P_{rx}(t)} = P_{rx_{ref}}(t) \times \mathit{eff}(t)^{-1} \quad \text{Equation (1)}$$

In Equation (1), $P_{tx_{ref}}(t)$ denotes a reference value of transmission side wireless power, $P_{rx_{ref}}(t)$ denotes a reference value of reception side wireless power, $P_{tx}(t)$ denotes transmission side wireless power, $P_{rx}(t)$ denotes reception side wireless power, and $\mathit{eff}(t)$ denotes wireless power transmission efficiency. The reference value of the transmission side wireless power may indicate a preferable value of the power output from the resonant circuit 314 of the wireless power transmitter 310. The reference value of the reception side wireless power may indicate a preferable value of the power received by the resonant circuit 321 of the wireless power receiver 320.

Figure 4A:
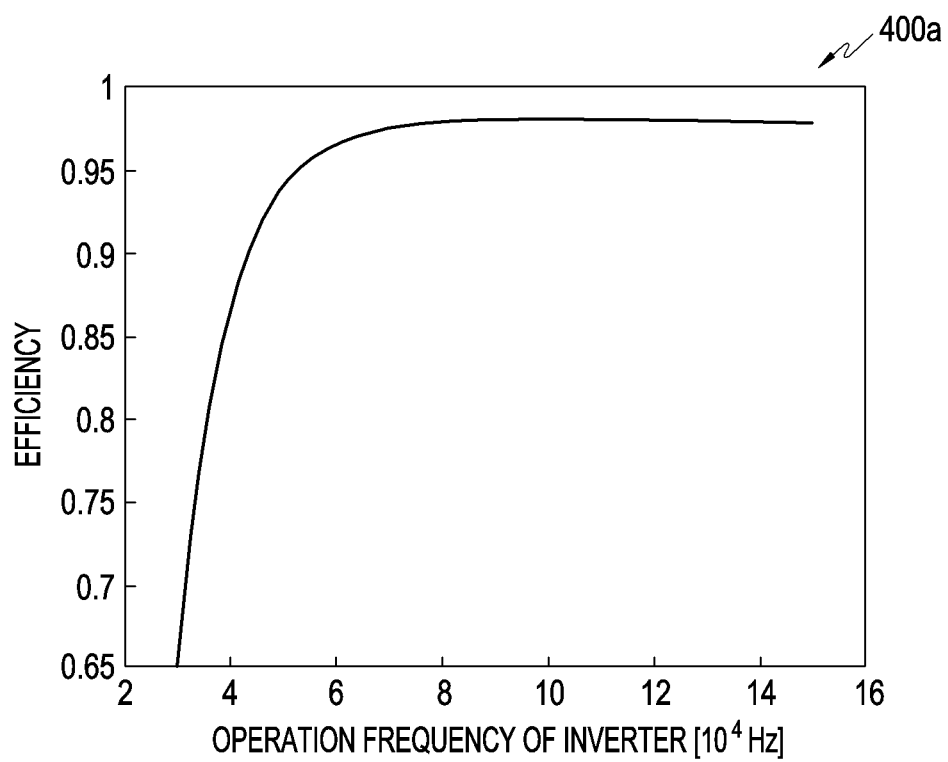
FIG. 4A illustrates the relationship between an operation frequency of the inverter of the wireless power transmitter and wireless power transmission efficiency according to an embodiment.

FIG. 4A illustrates the relationship between an operation frequency of the inverter of the wireless power transmitter and wireless power transmission efficiency according to an embodiment. Referring to graph 400a of FIG. 4A, it may be noted that a change range of an efficiency of the wireless power transmission is small enough to be ignored in a range in which the operation frequency of the inverter is sufficiently high even though the operation frequency of the inverter is controlled. That is, in the range in which the operation frequency of the inverter is sufficiently high, the efficiency of the wireless power transmission may be approximated to a constant. Accordingly, the processor 317 may identify that a value obtained by multiplying the identified reference value of the reception side wireless power by a reciprocal number of a numerical value of the power efficiency of the currently transmitted wireless power is the reference value of the transmission side wireless power. The processor 317 may identify a reference power value on the basis of the identified reference value of the transmission side wireless power. According to an embodiment, the processor 317 may update the reference power value in response to reception of reception side error information 345. When the reception side error information 345 is periodically received, the processor 317 may periodically update the reference power value.

The wireless power receiver 320 may include a resonant circuit 321, a rectifier 324, a battery 325, a voltage comparator 326, a current comparator 327, and a communication circuit 328. The resonant circuit 321 may include a capacitor 323 and a coil 322. The communication circuit 328 may include an antenna 329. Since the resonant circuit 321, the rectifier 324, and the battery 325 are substantially the same as the resonant circuit 221a, the rectifier 224a, and the battery 225a described above with reference to FIG. 2A, the detailed description thereof will be omitted. The communication circuit 328 is the same as the communication circuit 318 and thus detailed description thereof will be omitted.

The voltage comparator 326 may calculate an error 342 between a voltage 341 of the battery 325 and a reference voltage value (Vref) of the battery by comparing the voltage 341 of the battery 325 with the reference voltage value (Vref) of the battery. The current comparator 327 may calculate an error 344 between a current 343 of the battery 325 and a reference current value (Iref) of the battery by comparing the current 343 of the battery 325 with the reference current value (Iref) of the battery. The error 342 between the voltage 341 of the battery 325 and the reference voltage value (Vref) of the battery and the error 344 between the current 343 of the battery 325 and the reference current value (Iref) of the battery may be inserted into the reception side error information 345 and transmitted to the wireless power transmitter 310 through the antenna 329 of the communication circuit 328.

Although FIG. 3 illustrates the voltage comparator 326 and the current comparator 327 as operational amplifiers, implementation of the voltage comparator 326 and the current comparator 327 is not limited to the operational amplifier according to an embodiment. According to an embodiment, the wireless power receiver 320 may include a processor, and the processor of the wireless power receiver 320 may receive signals from a voltage sensor for detecting a voltage of the battery 325 and a current sensor for detecting a current of the battery 325 and perform the above-described operation of the voltage comparator 326 and the current comparator 327.

As in the wireless power transmission system 200a of FIG. 2A, in the wireless power transmission system 300 illustrated in FIG. 3, the processor 317 of the wireless power transmitter 310 may identify at least one of the voltage 331 of the power output from the PFC circuit 312 or the current 332 of the power output from the PFC circuit 312 and control the operation of the inverter 313 on the basis of at least one of the identified voltage 331 or current 332. Accordingly, the processor 317 may provide wireless power in which the ripple is reduced to the wireless power receiver 320. Further, the processor 317 of the wireless power transmitter 310 may receive reception side error information 345 transmitted from the antenna 329 of the wireless power receiver 320 through the antenna 319 of the communication circuit 318 and control the operation of the inverter 313 on the basis of the reception side error information 345 and the reference value of the reception side wireless power.

Figure 4B:
FIG. 4B illustrates signals related to the wireless power transmitter according to a comparative example.
Figure 4C:
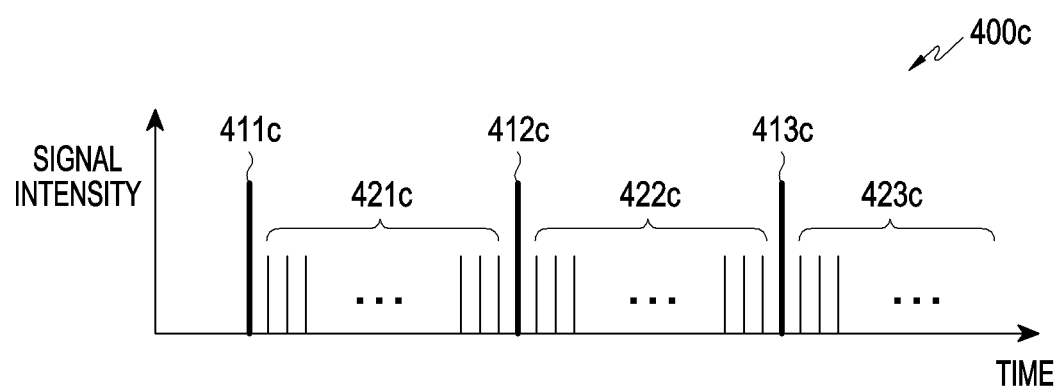
FIG. 4C illustrates signals related to the wireless power transmitter according to an embodiment.

FIG. 4B illustrates signals related to the wireless power transmitter according to a comparative example. FIG. 4C illustrates signals related to the wireless power transmitter according to an embodiment. Specifically, graph 400b of FIG. 4B illustrates signals identified by the wireless power transmitter 110 in a comparative example in which the wireless power transmitter 110 does not include the constant voltage control circuit 113, the wireless power receiver 120 does not include the constant voltage control circuit 123 and the charging control circuit 124, and reception side error information that is information on an error between the current and/or voltage value required by the wireless power receiver 120 and the actually supplied current and/or voltage value is transmitted to the wireless power transmitter 110 described above with reference to FIG. 1. Graph 400c of FIG. 4C illustrates signals identified by the processor 317 of the wireless power transmitter 310 illustrated in FIG. 3.

Referring to FIG. 4B, the wireless power transmitter may identify reception side error information. The signals 411b, 412b, and 413b of FIG. 4B indicate reception side error information.

Referring to FIGS. 3 and 4C, the processor 317 of the wireless power transmitter 310 may identify at least one of the voltage 331 of the power output from the PFC circuit 312 or the current 332 of the power output from the PFC circuit 312 and reception side error information received through the communication circuit 318. The signals 411c, 412c, and 413c of FIG. 4C indicate reception side error information received through the communication circuit 318. The signals 421c, 422c, and 423c of FIG. 4C may be signals received from a voltage sensor located at an output terminal of the PFC circuit 312 or signals received from a current sensor located at an output terminal of the PFC circuit 312, indicating at least one of the voltage 331 of the power output from the PFC circuit 312 or the current 332 of the power output from the PFC circuit 312.

As described with reference to FIG. 3, FIG. 4C illustrates that a frequency of identification of the signals 411c, 412c, and 413c is lower than a frequency of identification of the signals 421c, 422c, and 423c.

FIG. 4C illustrates that a strength of the signals 411c, 412c, and 413c is stronger than a strength of the signals 421c, 422c, and 423c, but it is only an illustrative means for distinguishing the signals 411c, 412c, and 413c and the signals 421c, 422c, and 423c but does not limit relative strengths of signals 411c, 412c, and 413c and the signals 421c, 422c, and 423c. According to an embodiment, there is no limitation in relative strengths of signals 411c, 412c, and 413c and the signals 421c, 422c, and 423c.

According to an embodiment, a frequency of reception of reception side error information by the processor 317 from the wireless power receiver 320 through the communication circuit 318 may be lower than a frequency of identification of at least one of the voltage 331 or the current 332 of the power output from the PFC circuit 312 by the processor 317. For example, the processor 317 may identify the reception side error information from the wireless power receiver 320 with the frequency higher than or equal to 10 Hz and equal to or lower than 100 Hz through BLE communication using the communication circuit 318 and identify at least one of the voltage 331 or the current 332 of the power output from the PFC circuit 312 with the frequency higher than or equal to 1 kHz and equal to or lower than 10 kHz.

Figure 5:
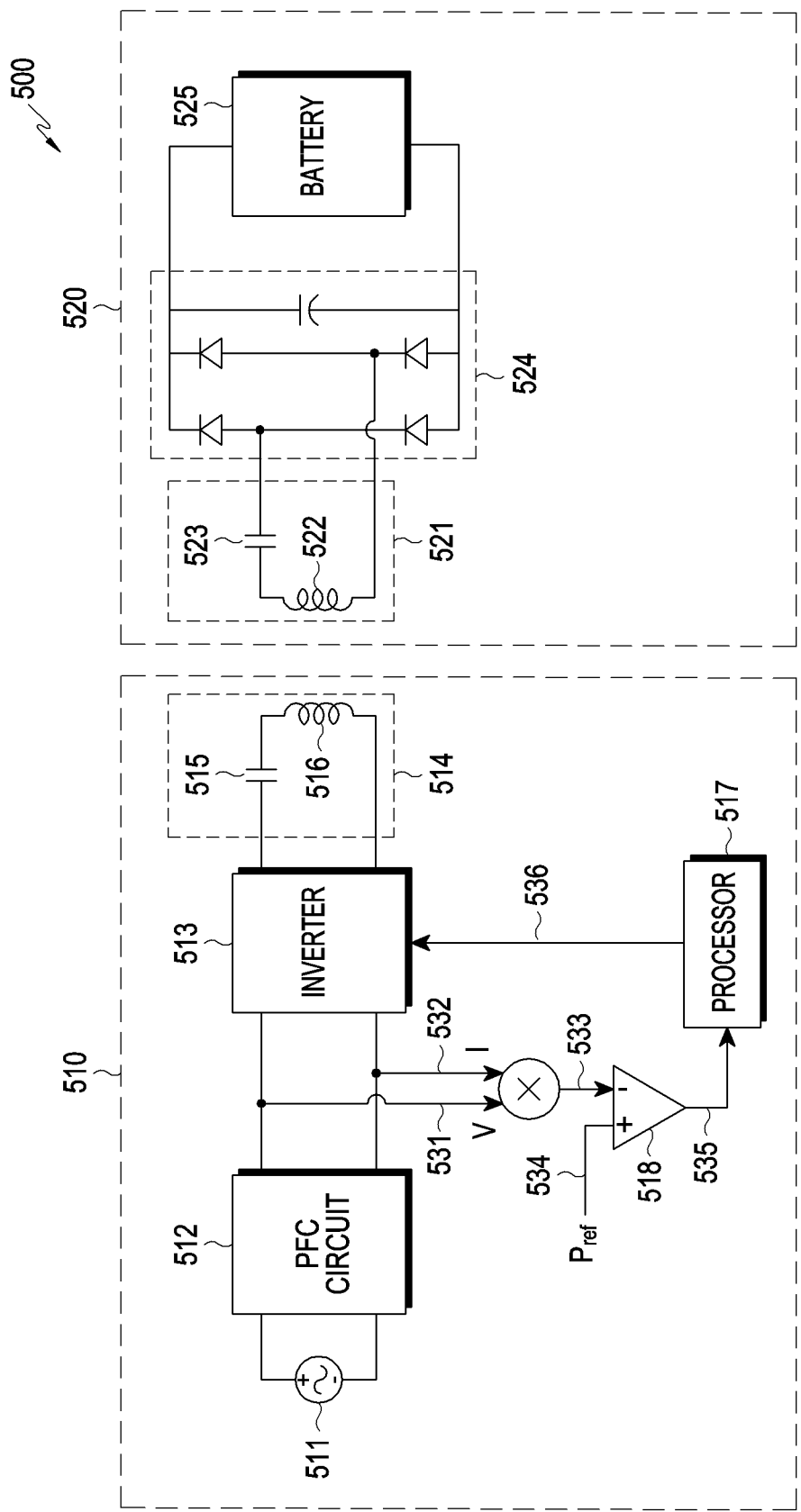
FIG. 5 is a block diagram of a wireless power transmission system including a wireless power transmitter according to an embodiment.

FIG. 5 is a block diagram of a wireless power transmission system including a wireless power transmitter according to an embodiment. Referring to FIG. 5, a wireless power transmission system 500 may include a wireless power transmitter 510 and a wireless power receiver 520. The wireless power transmitter 510 may include a power source 511, a PFC circuit 512, an inverter 513, a resonant circuit 514, a processor 517, and a power comparator 518. The resonant circuit 514 may include a capacitor 515 and a coil 516. The wireless power receiver 520 may include a resonant circuit 521, a rectifier 524, and a battery 525. The resonant circuit 521 may include a capacitor 523 and a coil 522. Since the power source 511, the PFC circuit 512, the inverter 513, the resonant circuit 514, and the processor 517 included in the wireless power transmitter 510, and the resonant circuit 521, the rectifier 524, and the battery 525 included in the wireless power receiver 520 are substantially the same as the power source 211a, the PFC circuit 212a, the inverter 213a, the resonant circuit 214a, the processor 217a, the resonant circuit 221a, the rectifier 224a, and the battery 225a described above with reference to FIG. 2A, the detailed description thereof will be omitted.

The power comparator 518 may compare power 533 obtained by multiplying the voltage 531 at the output terminal of the PFC circuit 512 and the current 532 at the output terminal of the PFC circuit 512 with a reference power value 534 and transfer an error 535 between the power at the output terminal of the PFC circuit 512, i.e., an output value of the output DC power, and the reference power value 534 to the processor 517.

Although FIG. 5 illustrates the power comparator 518 as an operational amplifier, implementation of the power comparator 518 is not limited to the operational amplifier according to an embodiment. According to an embodiment, the processor 517 of the wireless power transmitter 510 may receive signals from a voltage sensor for detecting the voltage at the output terminal of the PFC circuit 512 and a current sensor for detecting the current at the output terminal of the PFC circuit 512 and perform the above-described operation of the power comparator 518.

According to an embodiment, the wireless power transmitter 510 may further include a communication circuit for receiving reception side error information from the wireless power receiver 520. In this case, the wireless power receiver 520 may further include a voltage comparator, a current comparator, and a communication circuit for calculating reception side error information and transmitting the same to the wireless power transmitter 510. Since the communication circuit included in the wireless power transmitter 510, and the voltage comparator, the current comparator, and the communication circuit included in the wireless power receiver 520 substantially the same as the elements described above with reference to FIG. 3, the detailed description of these elements will not be repeated.

In an example in which the wireless power transmitter 510 further includes a communication circuit and the wireless power receiver 520 further includes a voltage comparator, a current comparator, and a communication circuit, the reference power value 534 may be identified on the basis of reception side error information as described above with reference to FIG. 3. According to an embodiment, the processor 517 may update the reference power value 534 in response to reception of the reception side error information.

When the reception side error information is periodically received, the processor 517 may periodically update the reference power value 534.

The processor 517 may control the operation of the inverter 513 on the basis of the error 535. According to an embodiment, when the power at the output terminal of the PFC circuit 512 is smaller than the reference power value 534, the processor 517 may control the inverter 513 to lower the operation frequency of the inverter 513. Alternatively, when the power at the output terminal of the PFC circuit 512 is larger than the reference power value 534, the processor 517 may control the inverter 513 to raise the operation frequency of the inverter 513. For example, the processor 517 may provide a control signal 536 configured to cause a change in the frequency of the inverter 513 to the inverter 513. According to an embodiment, the processor 517 may control the operation of the inverter 513 until the error 535 becomes equal to or smaller than a predetermined value. For example, when the processor 517 controls the operation frequency of the inverter 513, the processor 517 may control the operation frequency of the inverter 513 until the error 535 becomes equal to or smaller than a predetermined value.

Figure 6A:
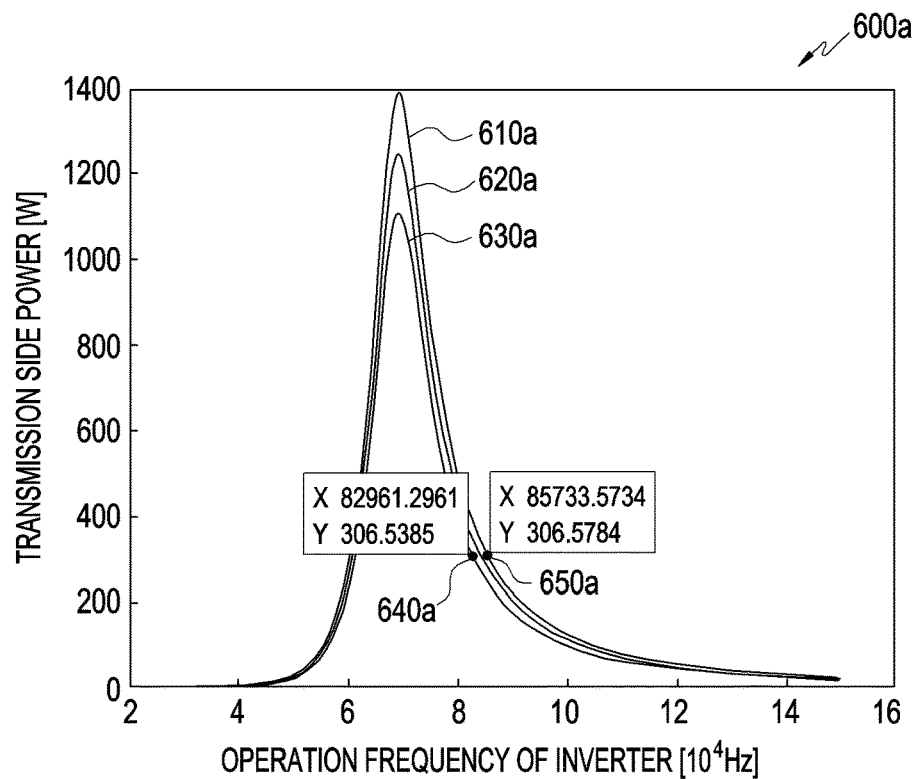
FIG. 6A illustrates the relationship between an operation frequency of an inverter of a wireless power transmitter and transmission side power according to an embodiment.

FIG. 6A illustrates the relationship between an operation frequency of an inverter of a wireless power transmitter and transmission side power according to an embodiment. A frequency of the transmission side power is the same as the operation frequency of the inverter, and the value of output power is determined according to the frequency of the transmission side power. In FIG. 6A, a position of a resonance frequency of about 70 kHz is a frequency of maximum power which can be transmitted. The value of output power varies as the frequency of power is controlled as shown in a graph of FIG. 6A. The ripple of the output power may be reduced by controlling the operation frequency of the inverter according to the size of the ripple of DC power input into the inverter on the basis of the relationship. In the graph 600a of FIG. 6A, a horizontal axis indicates the operation frequency of the inverter of the wireless power transmitter in units of 10000 Hz. In the graph 600a of FIG. 6A, a vertical axis indicates transmission side power, which is power output from the PFC of the wireless power transmitter and input into the inverter, in units of W. Curved lines 610a, 620a, and 630a indicate the relationship between the operation frequency of the inverter and the transmission side power when there is the ripple in the voltage output from the PFC of the wireless power transmitter and input into the inverter and, more specifically, when there is the ripple having a peak-to-peak value of 40 V, that is, ±20 V in the voltage of which an average value is 400 V. The curved line 610a indicates the relationship between the operation frequency of the inverter and the transmission side power when the voltage output from the PFC of the wireless power transmitter and input into the inverter is 400 V+20 V=420 V. The curved line 620a indicates the relationship between the operation frequency of the inverter and the transmission side power when the voltage output from the PFC of the wireless power transmitter and input into the inverter is 400 V. The curved line 630a indicates the relationship between the operation frequency of the inverter and the transmission side power when the voltage output from the PFC of the wireless power transmitter and input into the inverter is 400 V−20 V=380 V.

A point 640a on the curved line 630a and a point 650a on the curved line 610a indicates an example of a value of the operation frequency identified to control the operation frequency of the inverter and a value of the transmission side power corresponding to the operation frequency. A point 640a on the curved line 630a indicates that the voltage output from the PFC and input into the inverter is 400 V−20 V=380 V, the operation frequency of the inverter is about 82.96 kHz, and the transmission side power is about 306.54 W. A point 650a on the curved line 610a indicates that the voltage output from the PFC and input into the inverter is 400 V+20 V=420V, the operation frequency of the inverter is about 85.73 kHz, and the transmission side power is about 306.58 W. That is, when the voltage output from the PFC and input into the inverter varies between 400 V−20 V=380 V and 400 V+20 V=420V, the processor of the wireless power transmitter may control the inverter to change the operation frequency of the inverter between about 82.96 kHz and about 85.73 kHz, and as a result, the transmission side power may vary between about 306.54 W and about 306.58 W. According to an embodiment, it may be noted that the ripple of the transmission side power is very low power of 0.04 W through the control of the operation frequency of the inverter.

On the other hand, when the operation frequency of the inverter is not controlled, the operation frequency of the inverter is constantly maintained, in which case the size of the ripple of transmission side power may be identified on the basis of the assumption of a virtual line parallel to a vertical axis. For example, when it is assumed that there is a virtual line parallel to the vertical axis, passing through the point 640a or the point 650a, a y coordinate at a position at which the virtual line meets the curved line 610a indicates a maximum value of the transmission side power, and a y coordinate at a position at which the virtual line meets the curved line 630a indicates a minimum value of the transmission side power. It may be illustratively noted that a difference between they coordinate at the position at which the virtual line meets the curved line 610a and the y coordinate at the position at which the virtual line meets the curved line 630a is relatively large, e.g., larger than 0.04 W. That is, according to an embodiment, it may be noted that controlling the operation frequency of the inverter has an effect of reducing the ripple of the transmission side power compared to the case in which the operation frequency of the inverter is not controlled.

Figure 6B:
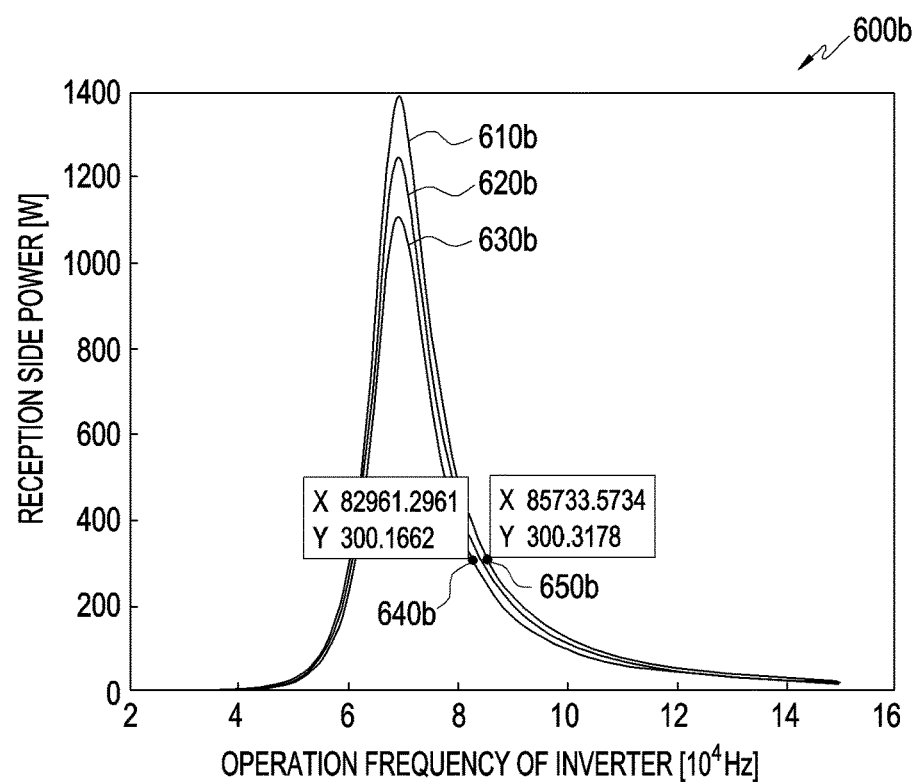
FIG. 6B illustrates the relationship between the operation frequency of the inverter and reception side power in the wireless power transmission system including the wireless power transmitter according to an embodiment.

FIG. 6B illustrates the relationship between the operation frequency of the inverter and reception side power in the wireless power transmission system including the wireless power transmitter according to an embodiment. In a graph 600b of FIG. 6B, a horizontal axis indicates the operation frequency of the inverter of the wireless power transmitter in units of 10000 Hz. In the graph 600b of FIG. 6B, a vertical axis indicates reception side power which is power supplied to a battery of the wireless power receiver in units of W. Curved lines 610b, 620b, and 630b indicate the relationship between the operation frequency of the inverter and the reception side power when there is the ripple in the voltage output from the PFC of the wireless power transmitter and input into the inverter and, more specifically, when there is the ripple having a width of 20 V in the voltage of which an average value is 400 V. The curved line 610b indicates the relationship between the operation frequency of the inverter and the reception side power when the voltage output from the PFC of the wireless power transmitter and input into the inverter is 400 V+20 V=420 V. The curved line 620b indicates the relationship between the operation frequency of the inverter and the reception side power when the voltage output from the PFC of the wireless power transmitter and input into the inverter is 400 V. The curved line 630b indicates the relationship between the operation frequency of the inverter and the reception side power when the voltage output from the PFC of the wireless power transmitter and input into the inverter is 400 V−20V=380V.

A point 640b on the curved line 630b and a point 650b on the curved line 610b indicates an example of a value of the operation frequency identified to control the operation frequency of the inverter and a value of the reception side power corresponding to the operation frequency according to an embodiment. A point 640b on the curved line 630b indicates that the voltage output from the PFC and input into the inverter is 400 V−20 V=380 V, the operation frequency of the inverter is about 82.96 kHz, and the reception side power is about 300.17 W. A point 650b on the curved line 610b indicates that the voltage output from the PFC and input into the inverter is 400 V+20 V=420V, the operation frequency of the inverter is about 85.73 kHz, and the reception side power is about 300.32 W. That is, when the voltage output from the PFC and input into the inverter varies between 400 V−20 V=380 V and 400 V+20 V=420V, the processor of the wireless power transmitter may control the inverter to change the operation frequency of the inverter between about 82.96 kHz and about 85.73 kHz, and as a result, the reception side power may vary between about 300.17 W and about 300.32 W. According to an embodiment, it may be noted that the ripple of the reception side power is very low power of 0.15 W through the control of the operation frequency of the inverter. According to an embodiment, the reception side power having the ripple of 0.15 W may satisfy the charging specification of the battery of the wireless power receiver.

On the other hand, when the operation frequency of the inverter is not controlled, the operation frequency of the inverter is constantly maintained, in which case the size of the ripple of the reception side power may be identified on the basis of the assumption of a virtual line parallel to a vertical axis. For example, when it is assumed that there is a virtual line parallel to the vertical axis, passing through the point 640b or the point 650b, a y coordinate at a position at which the virtual line meets the curved line 610b indicates a maximum value of the reception side power, and a y coordinate at a position at which the virtual line meets the curved line 630b indicates a minimum value of the reception side power. It may be noted that a difference between the y coordinate at the position at which the virtual line meets the curved line 610b and the y coordinate at the position at which the virtual line meets the curved line 630b is relatively large, e.g., larger than 0.15 W. That is, it may be noted that controlling the operation frequency of the inverter has an effect of reducing the ripple of the reception side power compared to the case in which the operation frequency of the inverter is not controlled.

For example, the graphs of FIGS. 6A and 6B may be obtained experimentally, may be obtained by pre-measurements, or may be approximated based on historical or learned values.

Figure 7:
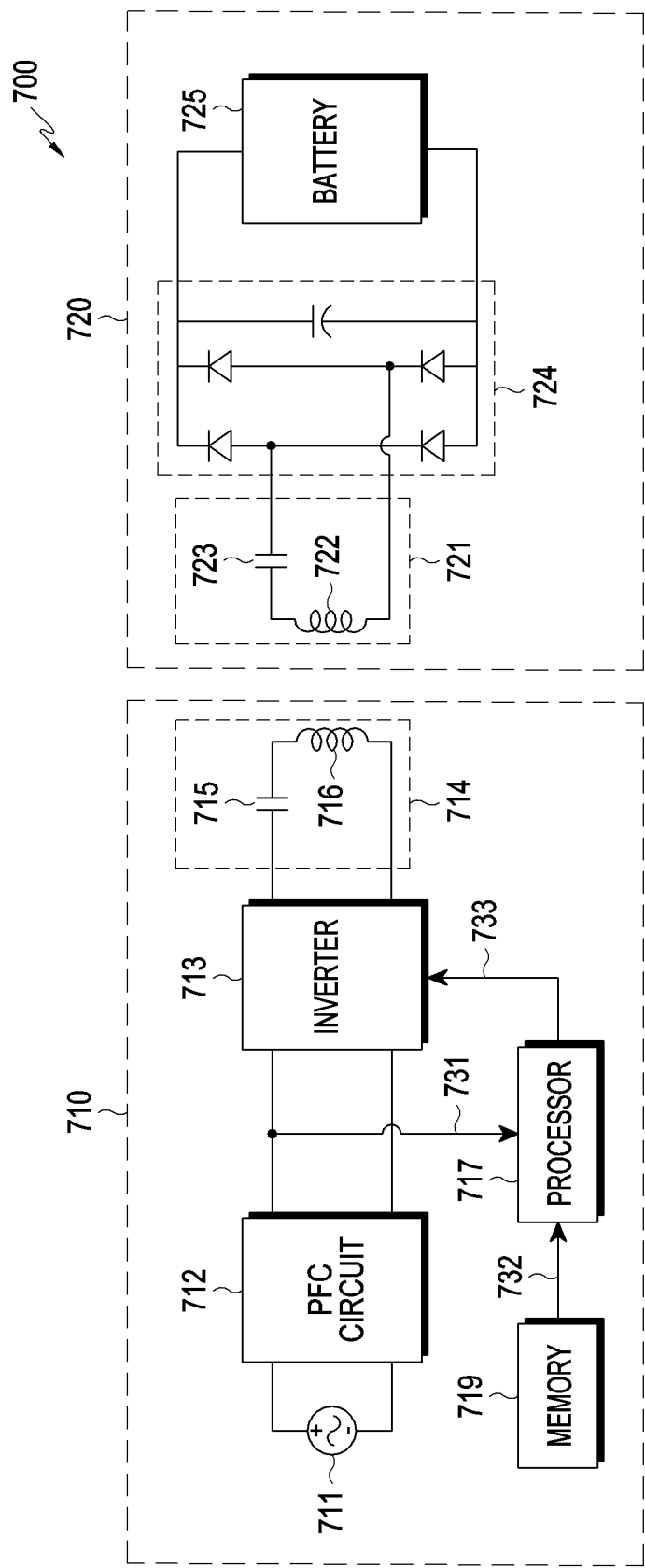
FIG. 7 is a block diagram of a wireless power transmission system including a wireless power transmitter according to an embodiment.

FIG. 7 is a block diagram of a wireless power transmission system including a wireless power transmitter according to an embodiment. Referring to FIG. 7, a wireless power transmission system 700 may include a wireless power transmitter 710 and a wireless power receiver 720. The wireless power transmitter 710 may include a power source 711, a PFC circuit 712, an inverter 713, a resonant circuit 714, a processor 717, and a memory 719. The resonant circuit 714 may include a capacitor 715 and a coil 716. The wireless power receiver 720 may include a resonant circuit 721, a rectifier 724, and a battery 725. The resonant circuit 721 may include a capacitor 723 and a coil 722. Since the power source 711, the PFC circuit 712, the inverter 713, the resonant circuit 714, and the processor 717 included in the wireless power transmitter 710, and the resonant circuit 721, the rectifier 724, and the battery 725 included in the wireless power receiver 720 are substantially the same as the power source 211a, the PFC circuit 212a, the inverter 213a, the resonant circuit 214a, the processor 217a, the resonant circuit 221a, the rectifier 224a, and the battery 225a described above with reference to FIG. 2A, the detailed description thereof will be omitted.

The memory 719 may store various pieces of data used by at least one element (for example, the processor 717) of the wireless power transmitter 710. The data may include, for example, software (for example, a program) and input data or output data of a command related thereto. The memory 719 may include volatile memory or non-volatile memory.

According to an embodiment, the memory 719 may store the relationship between the voltage output from the PFC and input into the inverter, the operation frequency of the inverter, and the transmission side power, described above with reference to FIG. 6A. Alternatively, according to an embodiment, the memory 719 may store the relationship between the voltage output from the PFC and input into the inverter, the operation frequency of the inverter, and the reception side power, described above with reference to FIG. 6B.

The processor 717 may identify a voltage 731 of power output from the PFC circuit 712. According to an embodiment, the processor 717 may identify the voltage 731 of the power output from the PFC circuit 712 by receiving a signal indicating the voltage from a voltage sensor located at an output terminal of the PFC circuit 712.

According to an embodiment, when the relationship between the voltage output from the PFC and input into the inverter, the operation frequency of the inverter, and the transmission side power is stored in the memory 719, the processor 717 may identify a reference power value 732 and identify a value of the operation frequency of the inverter to make the transmission side power the same as the reference power value 732 with reference to the relationship between the voltage output from the PFC and input into the inverter, the operation frequency of the inverter, and the transmission side power, stored in the memory 719, on the basis of the identified reference power value 732 and the voltage 731.

Since the process in which the reference power value is identified has been described above, a description thereof will be omitted. According to an embodiment, the processor 717 may identify the reference power value 732 on the basis of information received from the wireless power receiver 720 through a predetermined communication connection with the wireless power receiver 720 as well as the process described with reference to FIG. 3. According to an embodiment, the processor 717 may periodically update the identified reference power value 732 by periodically communicating with the wireless power receiver 720 or may identify the reference power value 732 once and then treat the reference power value as a constant without any update.

According to an embodiment, when the relationship between the voltage output from the PFC and input into the inverter, the operation frequency of the inverter, and the reception side power is stored, the processor 717 may identify a reference value of the reception side power. According to an embodiment, the processor 717 may perform the BLE communication described with reference to FIG. 3 with the wireless power receiver 720 through a communication circuit and periodically or aperiodically receive a reference value of the reception side power, so as to identify the reference value of the reception side power.

According to an embodiment, the processor 717 may identify the reference value of the reception side power on the basis of information received from the wireless power receiver 720 through a predetermined communication connection with the wireless power receiver 720. According to an embodiment, the processor 717 may periodically communicate with the wireless power receiver 720 and periodically update the identified reference value of the reception side power or identify the reference value of the reception side power once and then treat the reference value as a constant without any update.

According to an embodiment, when the relationship between the voltage of the power output from the PFC, the operation frequency of the inverter, and the reception side power is stored in the memory 719, the processor 717 may identify the reference value of the reception side power and identify a value of the operation frequency of the inverter to make the reception side power the same as the reference value of the reception side power with reference to the relationship between the voltage output from the PFC, the operation frequency of the inverter, and the reception side power, stored in the memory 719, on the basis of the identified reference value of the reception side power and the voltage 731.

After identifying the value of the operation frequency of the inverter, the processor 717 may transfer a control signal 733 to the inverter according to the identified value of the operation frequency of the inverter.

According to an embodiment, the embodiments described with reference to FIGS. 2, 3, 5, and 7 may be combined and implemented. According to an embodiment, FIGS. 2 and 5 may be combined and implemented. According to an embodiment, FIGS. 2 and 7 may be combined and implemented. According to an embodiment, FIGS. 3 and 5 may be combined and implemented. According to an embodiment, FIGS. 3 and 7 may be combined and implemented.

Figure 8:
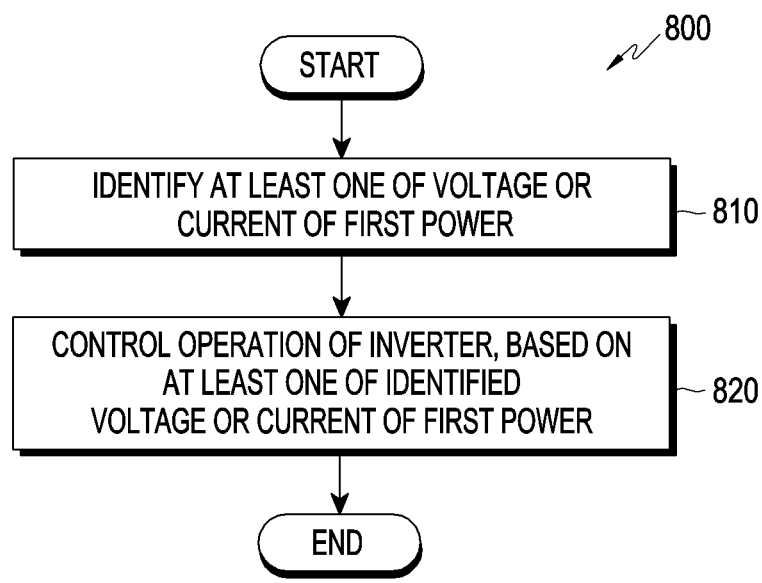
FIG. 8 is a flowchart illustrating an operation of a wireless power transmitter according to an embodiment.

FIG. 8 is a flowchart 800 illustrating an operation of a wireless power transmitter according to an embodiment. In operation 810, a processor (for example, the processor 217a) of a wireless power transmitter (for example, the wireless power transmitter 210a) may identify at least one of a voltage or a current of first power. The first power may be power output from a PFC circuit (for example, the PFC circuit 212a) of the wireless power transmitter 210a and input into an inverter (for example, the inverter 213a) of the wireless power transmitter 210a.

In operation 820, the processor 217a may control the operation of the inverter 213a on the basis of at least one of the identified voltage or current of the first power. According to an embodiment, operation 820 may include an operation of controlling at least one of an operation frequency of the inverter 213a, a duty ratio of a signal input into a gate of the inverter 213a, or a phase of the signal input into the gate of the inverter 213a. According to an embodiment, operation 820 may include an operation of controlling the operation of the inverter 213a until a difference between the value of the first power and the reference power value becomes equal to or smaller than a predetermined value on the basis of at least one of the voltage or the current of the first power.

Figure 9:
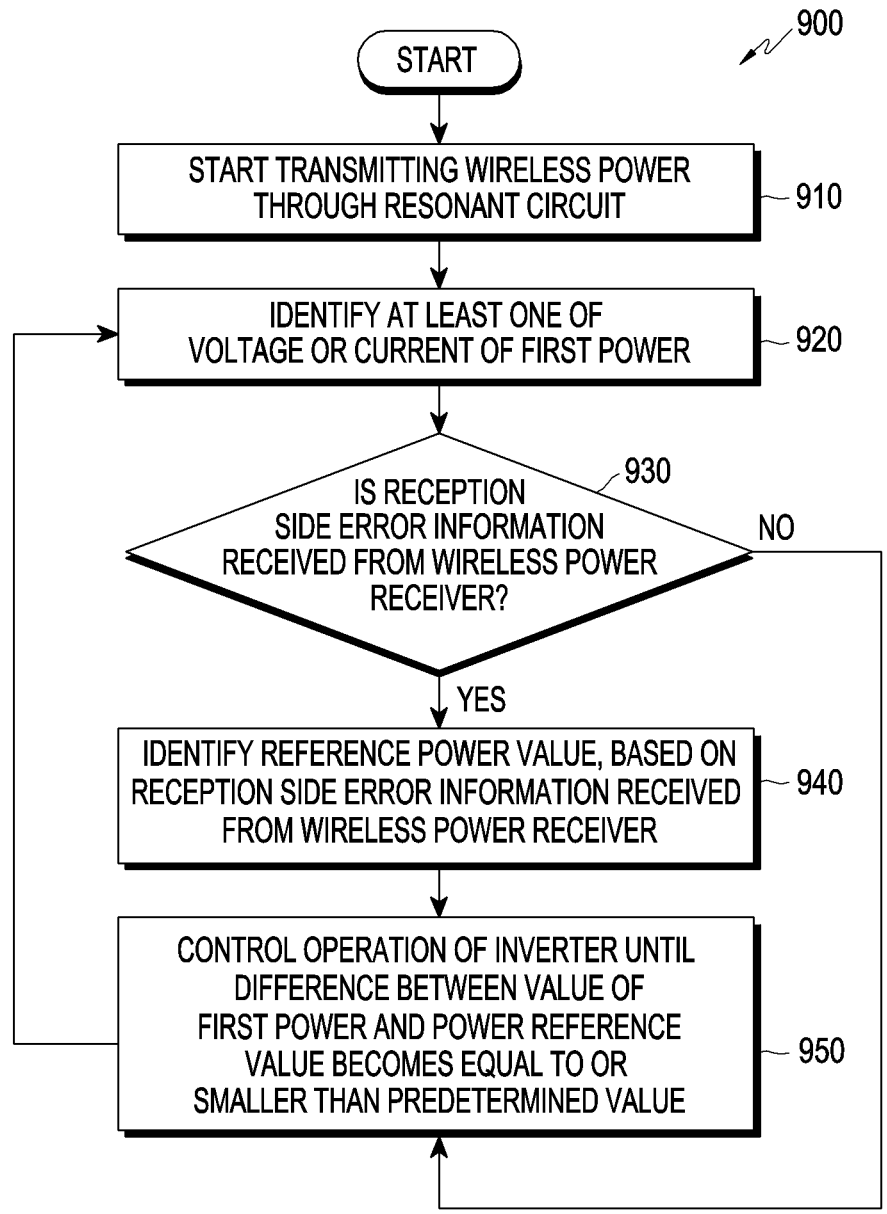
FIG. 9 is a flowchart illustrating an operation of a wireless power transmitter according to an embodiment.

FIG. 9 is a flowchart 900 illustrating an operation of a wireless power transmitter according to an embodiment. Specifically, the flowchart 900 of FIG. 9 shows the operation which can be performed by a wireless power transmitter (for example, the wireless power transmitter 310) configured to receive reception side error information from a wireless power receiver (for example, the wireless power receiver 320) as described above with reference to FIG. 3.

In operation 910, the wireless power transmitter 310 may start transmitting wireless power through a resonant circuit (for example, the resonant circuit 314).

In operation 920, a processor (for example, the processor 317) included in the wireless power transmitter 310 may identify at least one of a voltage or a current of first power. The first power may be power output from a PFC circuit (for example, the PFC circuit 312) of the wireless power transmitter 310 and input into an inverter (for example, the inverter 313) of the wireless power transmitter 310.

In operation 930, the processor 317 included in the wireless power transmitter 310 may identify whether reception side error information is received from a wireless power receiver (for example, the wireless power receiver 320) through a communication circuit (for example, the communication circuit 318).

When it is identified that the reception side error information is received from the wireless power receiver 320 in operation 930, the processor 317 may identify a reference power value on the basis of the reception side error information received from the wireless power receiver 320 in operation 940. The reference power value may be a preferable value as the value of the first power. Since the process of identifying the reference power value has been described with reference to FIG. 3, a description thereof will be omitted.

The processor 317 may control the operation of the inverter 313 until the difference between the value of the first power and the reference power value becomes equal to or smaller than a predetermined value in operation 950. According to an embodiment, operation 950 may include an operation of controlling at least one of an operation frequency of the inverter 313, a duty ratio of a signal input into a gate of the inverter 313, or a phase of the signal input into the gate of the inverter 313.

According to an embodiment, operation 950 may include an operation of controlling the operation frequency of the inverter 313 until the difference between the value of the first power and becomes equal to or smaller than a predetermined value, as described above with reference to FIG. 5. According to an embodiment, operation 950 may include an operation of controlling the operation frequency of the inverter 313 with reference to the relationship between the value of the first power, the operation frequency, and the voltage of the first power, stored in the memory, as described above with reference to FIG. 7.

When it is identified that the reception side error information is not received from the wireless power receiver 320 in operation 930, the processor 317 may perform operation 950 without performing operation 940. In this case, the reference power value may be a user-defined value stored in advance or a value determined in another operation or measurement cycle and stored.

According to embodiments, the wireless power transmitter may include the PFC circuit configured to convert AC power input from the power source into DC power; the inverter configured to convert the DC power output from the PFC into AC power; the power transmission circuit configured to transmit wireless power on the basis of the AC power output from the inverter; and at least one processor configured to identify at least one of a voltage or a current of the DC power output from the PFC circuit and input into the inverter and control an operation of the inverter on the basis of at least one of the identified voltage or current of the DC power.

According to embodiments, the at least one processor may be configured to control at least one of an operation frequency of the inverter, a duty ratio of a signal input into a gate of the inverter, or a phase of the signal input into the gate of the inverter on the basis of at least one of the voltage or the current of the DC power.

According to embodiments, the at least one processor may be configured to control the operation of the inverter until a difference between a value of the DC power and a reference power value becomes equal to or smaller than a predetermined value on the basis of at least one of the voltage or the current of the DC power.

According to embodiments, the wireless power transmitter may further include a communication circuit configured to communicate with the wireless power receiver, and the at least one processor may be configured to identify a reference power value, based on information received from the wireless power receiver through the communication.

According to embodiments, the information received from the wireless power receiver through the communication may indicate an error between a voltage value of a battery of the wireless power receiver and a reference voltage value of the battery and an error between a current value of the battery and a reference current value of the battery.

According to embodiments, a frequency of identification of at least one of the voltage or the current of the DC power by the at least one processor may be higher than a frequency of reception of the information by the at least one processor from the wireless power receiver through the communication circuit.

According to embodiments, the at least one processor may be configured to identify a reference value of reception side wireless power received by the wireless power receiver on the basis of the information received from the wireless power receiver through the communication, identify a reference value of transmission side wireless power transmitted by the resonant circuit by multiplying the identified reference value of the reception side wireless power by a reciprocal number of the power efficiency, and identify a reference power value on the basis of the reference value of the transmission side wireless power.

According to embodiments, the at least one processor may be configured to identify the voltage and the current of the DC power, identify a value of the DC power, based on the identified voltage and current of the DC power, and control an operation frequency of the inverter until the difference between the value of the DC power and the reference power value becomes equal to or smaller than the predetermined value.

According to embodiments, the wireless power transmitter may further include a memory configured to store a relationship between the voltage of the DC power, an operation frequency of the inverter, and the value of the DC power, and the at least one processor may be configured to identify the voltage of the DC power and control the operation frequency of the inverter to make the value of the DC power equal to the reference power value based on the identified voltage of the DC power and the relationship among the voltage of the DC power, the operation frequency of the inverter, and the value of the DC power stored in the memory.

According to embodiments, the communication may be BLE communication.

According to embodiments, the wireless power transmitter may include: the PFC circuit configured to convert AC power input from the power source into DC power; the inverter configured to convert the DC power output from the PFC into AC power; the power transmission circuit configured to transmit wireless power, based on the AC power output from the inverter; and at least one processor, wherein the at least one processor may be configured to identify a voltage and a current of the DC power output from the PFC circuit and input into the inverter, identify a value of the DC power on the basis of the identified voltage and current of the DC power, compare the identified value of the DC power with a reference power value, and control an operation frequency of the inverter until the difference between the value of the DC power and the reference power value becomes equal to or smaller than a predetermined value on the basis of a result of the comparison.

According to embodiments, a method performed by the at least one processor included in the wireless power transmitter may include an operation of identifying at least one of a voltage or a current of DC power output from the PFC circuit of the wireless power transmitter and input into the inverter of the wireless power transmitter, and an operation of controlling an operation of the inverter on the basis of at least one of the identified voltage or current of the DC power.

According to embodiments, the operation of controlling the operation of the inverter may include an operation of controlling at least one of an operation frequency of the inverter, a duty ratio of a signal input into a gate of the inverter, or a phase of the signal input into the gate of the inverter.

According to embodiments, the operation of controlling the operation of the inverter may include an operation of controlling the operation of the inverter until a difference between a value of the DC power and a reference power value becomes equal to or smaller than a predetermined value, based on at least one of the voltage or the current of the DC power.

According to embodiments, the method may further include an operation of receiving information from the wireless power receiver through a communication circuit of the wireless power transmitter, and an operation of identifying a value of the reference power value on the basis of the information received from the wireless power receiver.

According to embodiments, the received information may indicate an error between a voltage value of a battery of the wireless power receiver and a reference voltage value of the battery and an error between a current value of the battery and a reference current value of the battery.

According to embodiments, the operation of identifying the at least one of the voltage or the current of the DC power may performed with a frequency higher than that of the receiving of the information from the wireless power receiver.

According to embodiments, the operation of identifying the reference power value may include an operation of identifying a reference value of reception side wireless power received by the wireless power receiver on the basis of the received information, an operation of identifying a reference value of transmission side wireless power transmitted by the resonant circuit by multiplying the identified reference value of the reception side wireless power by a reciprocal number of power efficiency, and an operation of identifying the reference power value on the basis of the reference value of the transmission side wireless power.

According to embodiments, the operation of identifying at least one of the voltage or the current of the DC power may correspond to identifying the voltage and the current of the DC power, and may further include an operation of identifying the value of the DC power, based on the identified voltage and current of the DC power, and the operation of controlling the operation of the inverter may include an operation of controlling an operation frequency of the inverter until the difference between the value of the DC power and the reference power value becomes equal to or smaller than the predetermined value.

According to embodiments, the operation of identifying at least one of the voltage or the current of the DC power may correspond to identifying the voltage of the DC power, and the operation of controlling the operation of the inverter may include an operation of controlling the operation frequency of the inverter to make the value of the DC power equal to the reference power value on the basis of the relationship between the voltage of the DC power, the operation frequency of the inverter, and the value of the DC power, stored in the memory of the wireless power transmitter, and the identified voltage of the DC power.

According to embodiments, the method performed by the at least one processor of the wireless power transmitter may include an operation of identifying a voltage and a current of the DC power output from the PFC circuit of the wireless power transmitter and input into the inverter 213a, an operation of identifying a value of the DC power on the basis of the identified voltage and current of the DC power, an operation of comparing the identified value of the DC power with a reference power value, and an operation of controlling an operation frequency of the inverter until the difference between the value of the DC power and the reference power value becomes equal to or smaller than a predetermined value on the basis of a result of the comparison.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Embodiments of the disclosure may be implemented by software (e.g., program) containing one or more instructions stored in a machine-readable (e.g., computer-readable) storage medium (e.g., internal memory or external memory). The device is a device capable of loading a stored instruction from a storage medium and performing an operation according to the loaded instruction, and may include an electronic device according to the disclosed embodiments. When the instruction is executed by a processor, a function corresponding to the instruction may be performed directly by the processor or performed using other elements under the control of the processor. The instruction may include a code that is generated or executed by a compiler or interpreter. The machine-readable storage media may be non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:
1. A wireless power transmitter comprising:
 a power factor correction (PFC) circuit configured to convert first alternating current (AC) power input from a power source into direct current (DC) power;
 an inverter configured to convert the DC power output from the PFC circuit into second AC power;
 a power transmission circuit configured to transmit wireless power, based on the second AC power output from the inverter; and
 at least one processor configured to identify at least one of a voltage or a current of the DC power output from the PFC circuit, and control at least one of a duty ratio of a signal input into a gate of the inverter, or a frequency of the signal input into the gate of the inverter based on the identified at least one of the voltage or the current.
2. The wireless power transmitter of claim 1, wherein the at least one processor is further configured to:
 identify, based on a signal received from at least one output terminal of the PFC circuit, the at least one of the voltage or the current of the DC power, identify variation in the identified at least one of the voltage or the current, and control the at least one of the duty ratio of the signal input into the gate of the inverter, or the frequency of the signal input into the gate of the inverter based on the variation in the identified at least one of the voltage or the current, to reduce variation in the second AC power.

3. The wireless power transmitter of claim 1, wherein the at least one processor is further configured to, based on the identified at least one of the voltage or the current, control the at least one of the duty ratio of the signal input into the gate of the inverter, or the frequency of the signal input into the gate of the inverter to make a difference between a value of the DC power and a reference power value become equal to or smaller than a predetermined value.

4. The wireless power transmitter of claim 3, further comprising a communication circuit configured to communicate with a wireless power receiver configured to receive the wireless power,
wherein the at least one processor is further configured to identify the reference power value based on information received from the wireless power receiver through the communication circuit.

5. The wireless power transmitter of claim 4, wherein the information received from the wireless power receiver through the communication circuit indicates an error between a voltage value of a battery of the wireless power receiver and a reference voltage value of the battery and an error between a current value of the battery and a reference current value of the battery.

6. The wireless power transmitter of claim 4, wherein a frequency of the identifying the at least one of the voltage or the current by the at least one processor is higher than a frequency of receiving the information by the at least one processor from the wireless power receiver through the communication circuit.

7. The wireless power transmitter of claim 4, wherein the at least one processor is further configured to:
identify a first reference value of reception side wireless power received by the wireless power receiver, based on the information received from the wireless power receiver through the communication circuit;
identify a second reference value of the wireless power transmitted by the power transmission circuit by multiplying the first reference value of the reception side wireless power by a reciprocal number of a numerical value of a power efficiency of the wireless power transmitted by the power transmission circuit; and
identify the reference power value based on the second reference value of the wireless power transmitted by the power transmission circuit.

8. The wireless power transmitter of claim 4, wherein the communication circuit is further configured to communicate via Bluetooth Low Energy communication.

9. The wireless power transmitter of claim 3, wherein the at least one processor is further configured to:
identify the voltage and the current of the DC power;
identify the value of the DC power based on the identified voltage and the identified current; and
control an operation frequency of the inverter to make the difference between the value of the DC power and the reference power value become equal to or smaller than the predetermined value.

10. The wireless power transmitter of claim 9, further comprising a memory configured to store a relationship among the voltage of the DC power, the operation frequency of the inverter, and the value of the DC power,
wherein the at least one processor is further configured to:
identify the voltage of the DC power; and
control the operation frequency of the inverter to make the value of the DC power equal to the reference power value, based on the identified voltage of the DC power and the relationship stored in the memory.

11. A wireless power transmitter comprising:
a power factor correction (PFC) circuit configured to convert first alternating current (AC) power input from a power source into direct current (DC) power;
an inverter configured to convert the DC power output from the PFC circuit into second AC power;
a power transmission circuit configured to transmit a wireless power, based on the second AC power output from the inverter; and
at least one processor configured to:
identify a voltage and a current of the DC power output from the PFC circuit and input into the inverter;
identify a value of the DC power, based on the identified voltage and the identified current;
compare the identified value of the DC power with a reference power value; and
control an operation frequency of the inverter to make a difference between the value of the DC power and the reference power value become equal to or smaller than a predetermined value, based on a result of the comparing the value of the DC power with the reference power value.

12. A method performed by at least one processor included in a wireless power transmitter, the method comprising:
converting, by a power factor correction (PFC) circuit of the wireless power transmitter, first alternating current (AC) power input from a power source into direct current (DC) power;
identifying at least one of a voltage or a current of the DC power output from the PFC circuit and input into an inverter of the wireless power transmitter;
controlling at least one of a duty ratio of a signal input into a gate of the inverter, or a frequency of the signal input into the gate of the inverter based on the identified at least one of the voltage or the current, to convert the DC power into second AC power; and
transmitting wireless power based on the second AC power.

13. The method of claim 12, wherein the controlling the at least one of the duty ratio of the signal input into the gate of the inverter, or the frequency of the signal input into the gate of the inverter comprises controlling the at least one of the duty ratio of the signal input into the gate of the inverter, or the frequency of the signal input into the gate of the inverter to make a difference between a value of the DC power and a reference power value become equal to or smaller than a predetermined value, based on the identified at least one of the voltage or the current.

14. The method of claim 13, further comprising:
receiving information from a wireless power receiver through a communication circuit of the wireless power transmitter; and
identifying the reference power value, based on the information received from the wireless power receiver.

15. The method of claim 14, wherein the received information indicates an error between a voltage value of a battery of the wireless power receiver and a reference voltage value of the battery and an error between a current value of the battery and a reference current value of the battery.

16. The method of claim 14, wherein the identifying the at least one of the voltage or the current is performed with a frequency higher than a frequency of the receiving the information from the wireless power receiver.

17. The method of claim 14, wherein the identifying the reference power value comprises:
identifying a first reference value of reception side wireless power received by the wireless power receiver, based on the received information;
identifying a second reference value of the wireless power transmitted by the wireless power transmitter by multiplying the first reference value of the reception side wireless power by a reciprocal number of a numerical value of a power efficiency of the wireless power transmitted by the wireless power transmitter; and
identifying the reference power value, based on the second reference value.

18. The method of claim 13, wherein the identifying the at least one of the voltage or the current of the DC power comprises identifying the voltage and the current of the DC power, and identifying the value of the DC power, based on the identified voltage and the identified current, and
wherein the method further comprises controlling an operation frequency of the inverter to make the difference between the value of the DC power and the reference power value become equal to or smaller than the predetermined value.

19. The method of claim 18, wherein the identifying the at least one of the voltage or the current of the DC power comprises identifying the voltage of the DC power, and
the controlling the operation frequency of the inverter further comprises controlling the operation frequency of the inverter to make the value of the DC power equal to the reference power value, based on the identified voltage and a relationship among the voltage of the DC power, the operation frequency of the inverter, and the value of the DC power that is stored in a memory of the wireless power transmitter.

20. A wireless power transmitter comprising:
a power factor correction (PFC) circuit configured to convert input first alternating current (AC) power input from a power source into direct current (DC) power;
an inverter directly connected to the PFC circuit and configured to convert the DC power into second AC power;
a power transmission circuit connected to the inverter and configured to transmit a wireless power generated based on the second AC power; and
at least one processor configured to:
measure a voltage and a current of the DC power, at an output terminal of the PFC circuit,
determine a value of the DC power based on the voltage and the current, and
determine a difference between the value of the DC power and a reference power value, and control an operation frequency of the inverter to make the difference become equal to or smaller than a predetermined value, based on the voltage and the current.

21. The wireless power transmitter of claim 20, wherein the at least one processor is further configured to:
control the operation frequency of the inverter to make the difference become equal to or smaller than the predetermined value, by periodically re-measuring the voltage and the current, determining the value of the DC power based on the re-measured voltage and the re-measured current, and determining again the difference between the value of the DC power and the reference power value.

22. The wireless power transmitter of claim 20, wherein the at least one processor is further configured to receive error information from a wireless power receiver coupled to the wireless power transmitter to receive the wireless power, the error information being indicative of an error in a voltage and a current of a battery included in the wireless power receiver, and
identify the reference power value based on the error information.

23. The wireless power transmitter of claim 22, wherein the wireless power transmitter and the wireless power receiver communicate via Bluetooth Low Energy, and
a frequency of the re-measuring the voltage and the current by the at least one processor is higher than a frequency of a reception of the error information by the at least one processor from the wireless power receiver.

* * * * *